United States Patent [19]

Oikawa et al.

[11] Patent Number: 5,708,128
[45] Date of Patent: Jan. 13, 1998

[54] LINEAR POLYAMIC ACID, LINEAR POLYIMIDE AND THERMOSET POLYIMIDE

[75] Inventors: Hideaki Oikawa, Kanagawa-ken; Shoji Tamai, Fukuoka-ken; Masahiro Ohta; Akihiro Yamaguchi, both of Kanagawa-ken, all of Japan

[73] Assignee: Mitsui Toatsu Chemicals, Inc., Tokyo, Japan

[21] Appl. No.: 668,836

[22] Filed: Jun. 24, 1996

[30] Foreign Application Priority Data

Jun. 28, 1995 [JP] Japan .................. 7-162100

[51] Int. Cl.$^6$ .................. C08G 69/26; C08G 73/10
[52] U.S. Cl. .................. 528/353; 528/125; 528/128; 528/172; 528/173; 528/174; 528/176; 528/183; 528/185; 528/188; 528/220; 528/229; 528/350; 528/352; 524/606; 524/607; 525/262; 525/275; 525/282; 525/285; 428/411.1
[58] Field of Search .................. 528/353, 125, 528/128, 172, 173, 174, 176, 183, 185, 188, 220, 229, 350, 352; 524/606, 607; 525/262, 275, 282, 285; 428/411.1

[56] References Cited

U.S. PATENT DOCUMENTS

| | | | |
|---|---|---|---|
| 5,043,419 | 8/1991 | Ohta et al. | 528/353 |
| 5,066,771 | 11/1991 | Hino et al. | 528/353 |
| 5,412,066 | 5/1995 | Hergenrother et al. | 528/353 |
| 5,478,915 | 12/1995 | Amone et al. | 528/128 |
| 5,567,800 | 10/1996 | Hergenrother et al. | 528/128 |

Primary Examiner—P. Hampton-Hightower
Attorney, Agent, or Firm—Burns, Doane, Swecker & Mathis

[57] ABSTRACT

Novel thermoset polyimide and composite materials comprising the thermoset polyimides and a fibrous reinforcement are prepared according to this invention. The thermoset polyimides are obtained by heat-treating a linear polyamic acid or a linear polyimide prepared by using 4,4'-bis(3-aminophenoxy)biphenyl and pyromellitic dianhydride as essential monomers or by adding 4,4'-diaminodiphenyl ether or 3,3',4,4'-biphenyltetracarboxylic dianhydride to the essential monomers and by end-capping the molecular chain end with an aromatic dicarboxylic anhydride having a carbon-carbon triple bond. The thermoset polyimides have essential excellent properties of thermoplastic polyimide and additionally has enhanced heat resistance and improved mechanical properties. The thermoset polyimide can be used to provide various kinds of composite materials for aircraft matrices, electric and electronic appliances and others.

14 Claims, No Drawings

LINEAR POLYAMIC ACID, LINEAR POLYIMIDE AND THERMOSET POLYIMIDE

BACKGROUND OF THE INVENTION

1. Field of the Invention

The present invention relates to a novel linear polyamic acid or a linear polyimide, and a thermoset polyimide obtained by heat treating the linear polyamic acid or linear polyimide, and a composite material comprising the thermoset polyimide and a fibrous reinforcement.

The thermoset polyimide of the invention has various excellent properties of thermoplastic polyimide and also has enhanced heat resistance. A composite material comprising linear polyimide of the invention or its precursor, linear polyamic acid, and the fibrous reinforcement is cured by heat-treatment to provide a composite material having very excellent heat resistance.

2. Related Art of the Invention

Conventionally, polyimide has outstanding heat resistance and additionally is excellent in various properties such as mechanical strength, chemical resistance, flame retardance and electrical properties. Consequently, polyimide has been widely used in various fields such as a molding material, composite material, electric appliance and electronic parts.

For example, representative polyimide which has been known has recurring units of the formula (A):

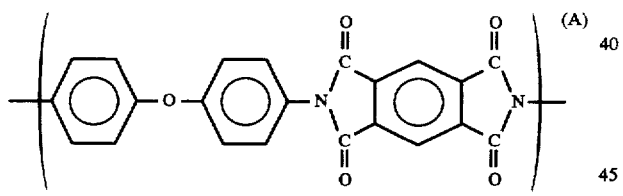

(Trade Mark; Kapton and Vespel manufactured by E.I. Du Pont Nemours & Co.)

This type of polyimide is non-thermoplastic, insoluble and infusible and thus has difficulty in processing ability.

Polyimide having recurring units of the formula (B):

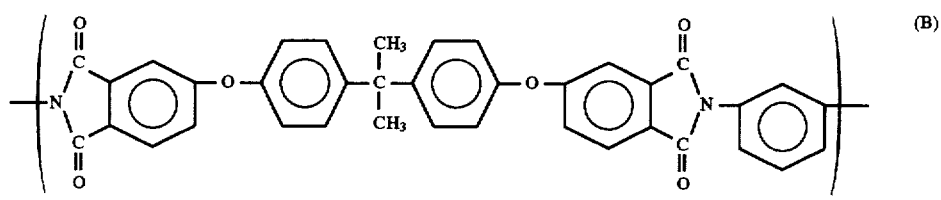

Trade Mark; Ultem, manufactured by G.E.Co.) has been known as amorphous, thermoplastic polyimide having improved processing ability (U.S. Pat. No. 3,847,867). However, the polyimide has a glass transition temperature of 215° C. and is unsatisfactory in heat resistance.

Further, polyimide having recurring units of the formula (C):

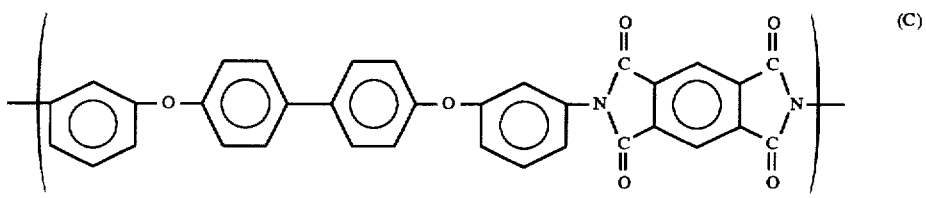

can be melt processed while maintaining heat resistance, solvent resistance and mechanical strengths which are essential characteristics of polyimide (U.S. Pat. No. 5,043,419).

However, the polyimide is thermoplastic and has a glass transition temperature of (250° C. Use of the polyimide above 250° C. accompanies deformation, swelling, softening and remarkable reduction of properties, and is thus substantially impossible.

On the other hand, polyimide having recurring units of the formula

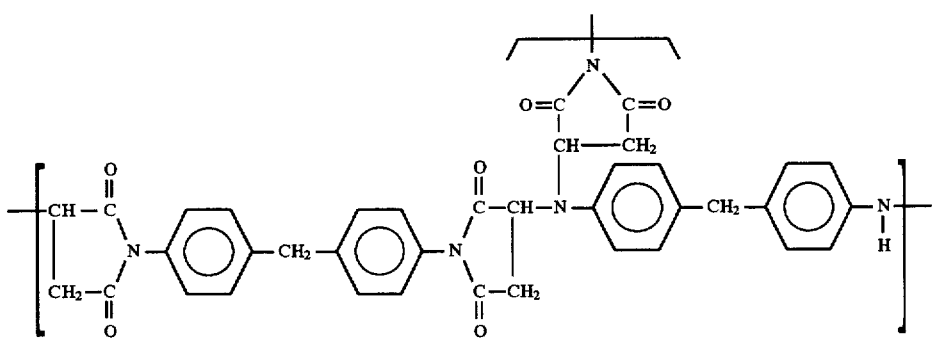

(Trade Mark; Kelimide-601, manufactured by Rohne Poulenc Co.; F.D. Darmory, National Sampe Symposium, 19, p. 693 (1974)) has been known as thermosetting polyimide. The polyimide has thermosetting property and is thus difficult to deform or soften as compared with thermoplastic polyimide. Consequently, the polyimide can be use at higher temperatures, whereas it is inferior in mechanical properties.

Further, U.S. Pat. No. 5,412,066 has disclosed another thermosetting polyimide obtained by heat-treating a polyimide oligomer which has a carbon-carbon triple bond at the molecular chain end and is represented by the formula (E):

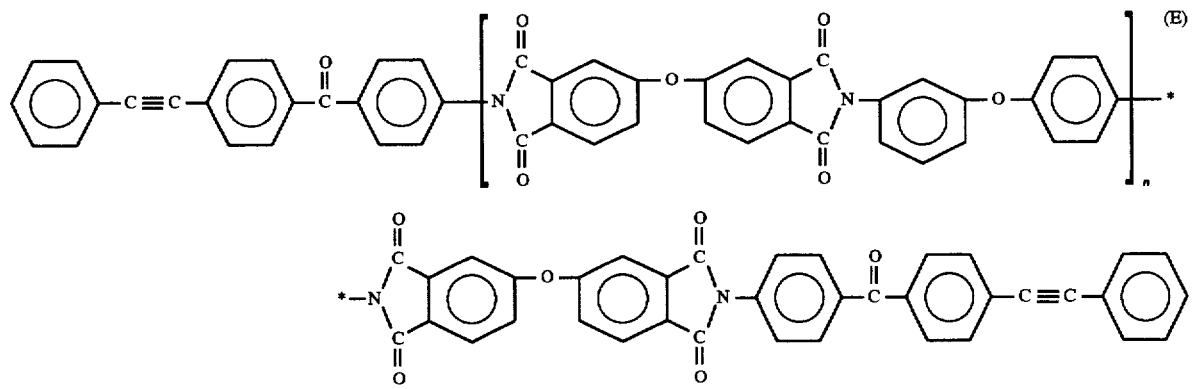

The polyimide has thermosetting property and has a glass transition temperature of 230°–250° C. even after heat-treatment. The thermoset polyimide is insufficient in heat resistance and an upper limit exists in high temperature use.

SUMMARY OF THE INVENTION

One object of the invention is to provide polyimide having very excellent heat resistance, that is, thermoset polyimide which has excellent properties of thermoplastic polyimide and is obtained by further improving the heat resistance of the thermoplastic polyimide.

Another object of the invention is to provide linear polyimide or linear polyamic acid which is capped at the end of the molecule with a reactive end-capping agent and can be heat-cured to provide thermoset polyimide having excellent heat resistance.

A further object of the invention is to provide a composite material which comprises the thermoset polyimide and a fibrous reinforcement and has excellent heat resistance and mechanical properties by heat-treating a composite material comprising the linear polyimide or linear polyamic acid and the fibrous reinforcement.

As a result of an intensive investigation in order to accomplish the above objects, the present inventors have found that thermoset polyimide obtained by heat-treating linear polyimide or linear polyamic acid which has specific recurring units and is capped at the end of the molecule with aromatic dicarboxylic anhydride having a carbon-carbon triple bond, has essential properties of a corresponding thermoplastic polyimide or polyimide copolymer having the specific recurring units and is very excellent in heat resistance and mechanical properties. Thus, the present invention has been completed.

That is, one aspect of the invention is

① linear polyimide represented by the formula (1):

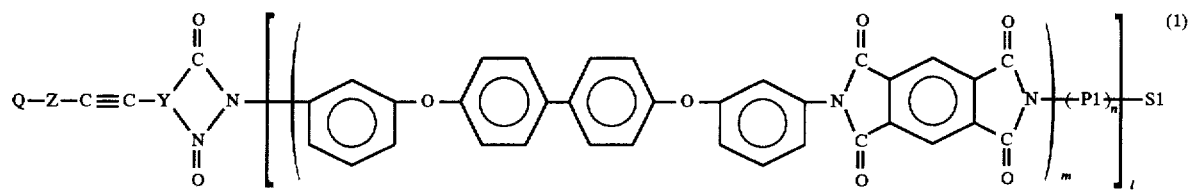

wherein P1 is recurring units of the formula (a) or the formula (b):

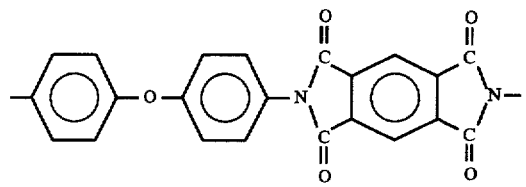

(a)

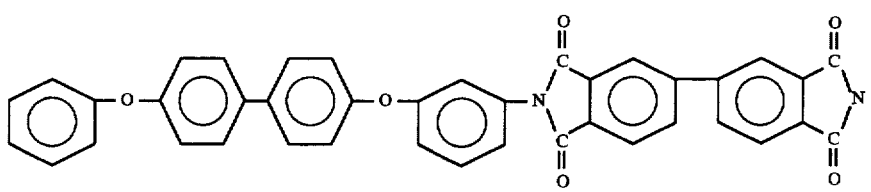

(b)

and S1 is one or more monovalent radicals represented by the formula (c) or the formula (d):

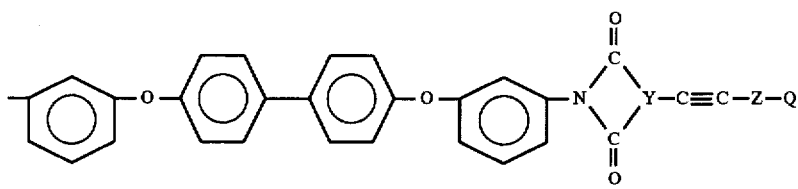

(c)

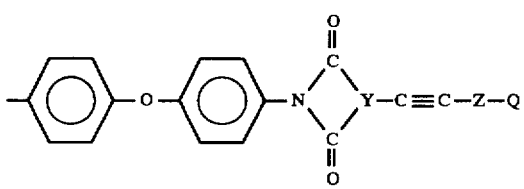

(d)

wherein Y and Z are radicals having 6~18 carbon atoms and are respectively selected from a monoaromatic radical, condensed polyaromatic radical or non-condensed aromatic radical connected to each other with a bridge member selected from a direct bond, carbonyl radical, sulfonyl radical, sulfoxide radical, ether radical, isopropylidene radical, hexafluorinated isopropylidene radical or sulfide radical, Y is a trivalent radical, Z is a divalent radical, Q is a monovalent substituent located on an aromatic ring of Z and is selected from a hydrogen atom, halogen atom, alkyl or alkoxy radical having 1~3 carbon atoms, cyano radical, or halogenated alkyl or halogenated alkoxy radical having 1~3 carbon atoms wherein hydrogen atoms of the alkyl or alkoxy radical are partly or totally substituted with halogen atoms, m and n are respectively mol % of recurring units, m is 100~1 mol %, n is 0~99 mol %, fixed order or regularity is absent among the recurring units, and l is a polymerization degree and is an integer of 1~100;

② linear polyamic acid, the precursor of the linear polyimide, represented by the formula (2):

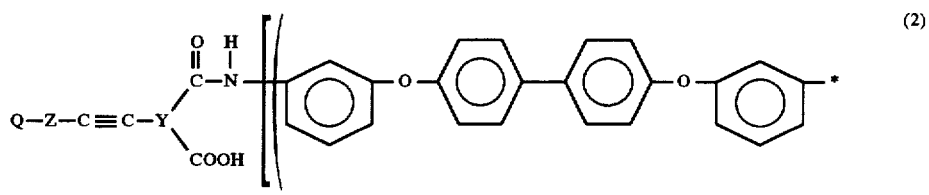

(2)

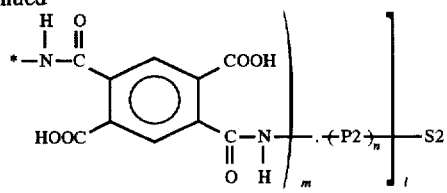

wherein P2 is recurring units of the formula (e) or the formula (f):

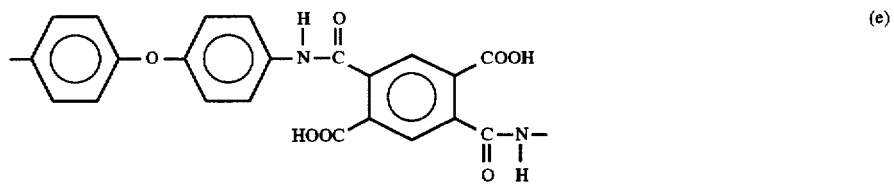

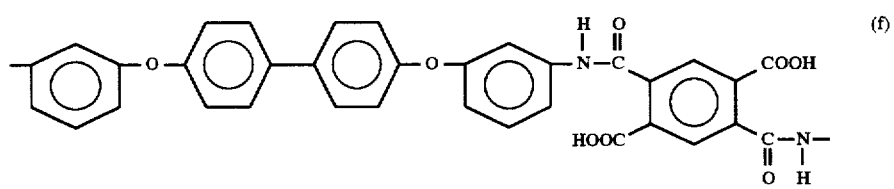

and S2 is one or more monovalent radicals represented by the formula (g) or the formula (h):

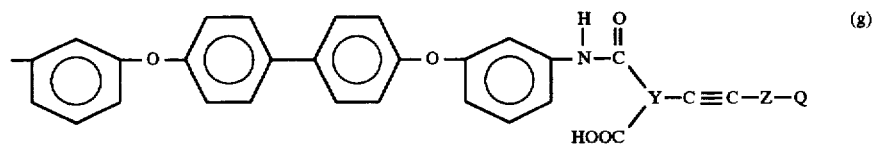

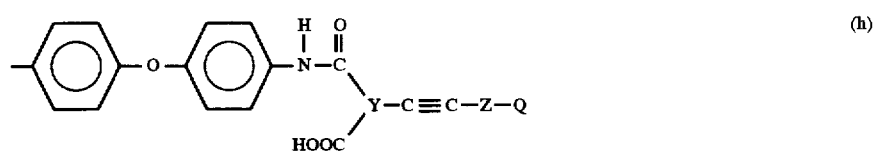

wherein Y, Z, Q, m, n and l are the same as in the formula (1); and

③ thermoset polyimide obtained by heat-curing the above linear polyimide and/or linear polyamic acid. Another aspect of the invention is ④ a composite material which comprises the above linear polyimide and/or linear polyamic acid and a fibrous reinforcement, and a composite material which is obtained by heating said composite material and comprises thermoset polyimide and said fibrous reinforcement.

The preparation of above linear polyimide and/or linear polyamic acid comprises (a) using as a diamine ingredient 4,4'-bis(3-aminophenoxy)biphenyl of the formula (1-1):

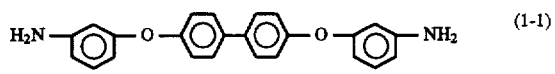

singly or as a mixture with 4,4'-diaminodiphenyl ether of the formula (1-2):

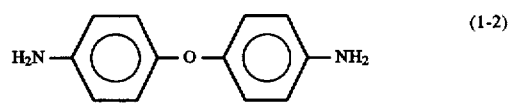

(b) using, as a tetracarboxylic dianhydride ingredient, pyromellitic dianhydride of the formula (1-3):

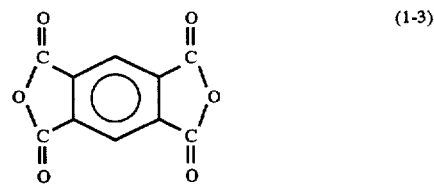

singly or as a mixture with 3,3',4,4'-biphenyltetracarboxylic dianhydride of the formula (1-4):

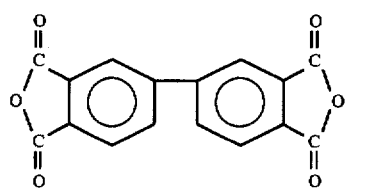

(1-4)

when the diamine ingredient is 4,4'-bis(3-aminophenoxy)biphenyl of the formula (1-1) alone or using pyromellitic dianhydride of the formula (1-3) singly when the diamine ingredient is a mixture of 4,4'-bis(3-aminophenoxy)biphenyl of the formula (1-1) with 4,4'-diaminodiphenyl ether of the formula (1-2), and (c) reacting in the presence, as an end-capping agent of the molecule, of an aromatic dicarboxylic anhydride which has a carbon-carbon triple bond and is represented by the formula (1-5):

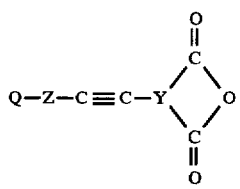

(1-5)

wherein Y and Z are radicals having 6–18 carbon atoms and are respectively selected from a monoaromatic radical, condensed polyaromatic radical or noncondensed aromatic radical connected to each other with a bridge member selected from a direct bond, carbonyl radical, sulfonyl radical, sulfoxide radical, ether radical, isopropylidene radical, hexafluorinated isopropylidene radical or sulfide radical, Y is a trivalent radical, Z is a divalent radical, Q is a monovalent substituent located on an aromatic ring of Z and is selected from a hydrogen atom, halogen atom, alkyl or alkoxy radical having 1–3 carbon atoms, cyano radical, or halogenated alkyl or halogenated alkoxy radical having 1–3 carbon atoms wherein hydrogen atoms of the alkyl or alkoxy radical are partly or totally substituted with halogen atoms.

The end-capping agent of the formula (1-5) is preferably aromatic dicarboxylic anhydride which has carbon-carbon triple bond and is represented by the formula (1-6):

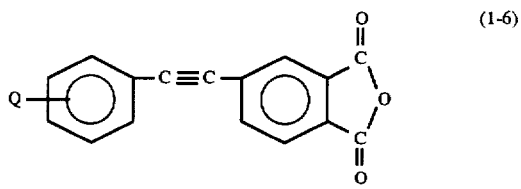

(1-6)

wherein Q is the same as in the formula (1-5), more preferably 1-phenyl- 2-(3,4-dicarboxyphenyl)acetylene anhydride of the formula (1-7):

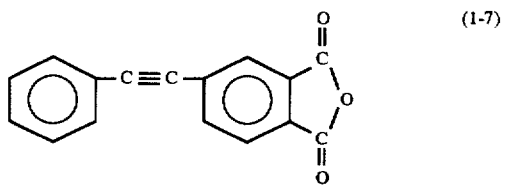

(1-7)

Linear polyimide or linear polyamic acid which can be used in the invention preferably includes linear polyimide represented by the formula (3):

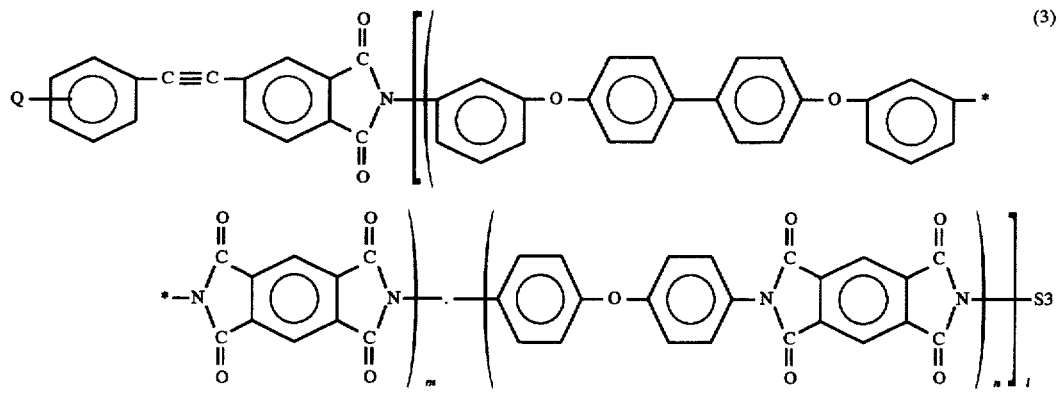

(3)

wherein S3 is one or more monovalent radicals represented by the formula (i) or the formula (j):

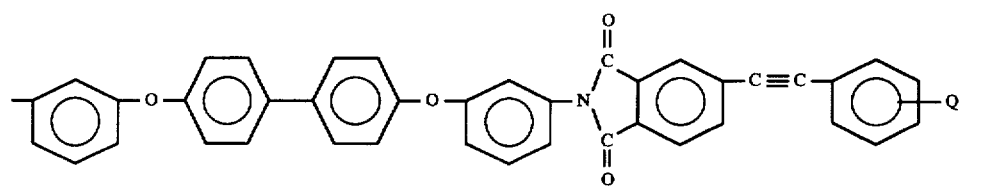

(i)

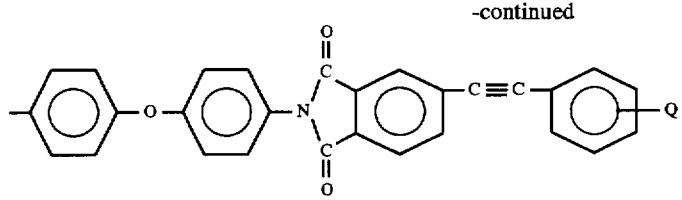
(j)

Q is a monovalent radical selected from a hydrogen atom, halogen atom, alkyl or alkoxy radical having 1–3 carbon atoms, cyano radical, or halogenated alkyl or halogenated alkoxy radical having 1–3 carbon atoms wherein hydrogen atoms of the alkyl or alkoxy radical are partly or totally substituted with halogen atoms, m and n are respectively 10 mol % of recurring units, m is 100–70 mol %, n is 0–30 mol %, fixed order or regularity is absent among the recurring units, and l is a polymerization degree and is an integer of 1–100, or linear polyamic acid, the precursor of said linear polyimide, represented by the formula (4):

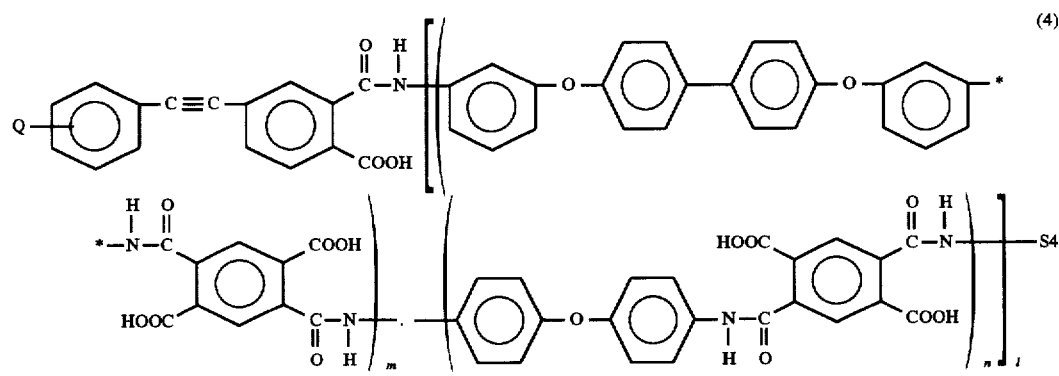

wherein S4 is one or more monovalent radicals represented by the formula (k) and the formula (l):

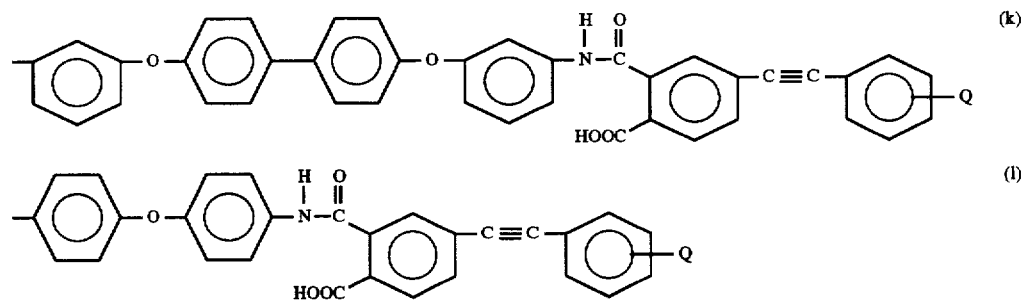

Q, m, n, and l are the same as in the formula (3); and linear polyimide represented by the formula (5):

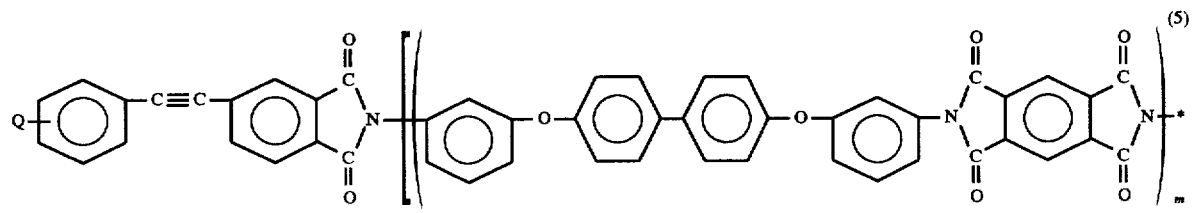

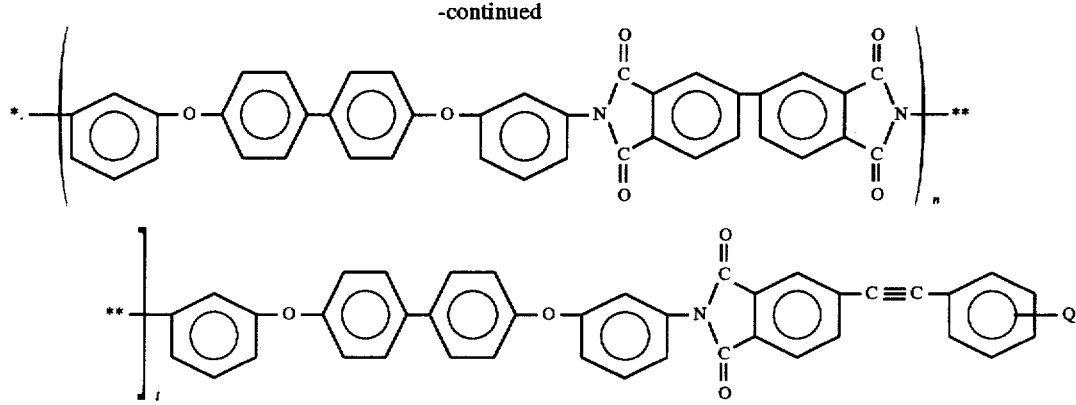

wherein Q is a monovalent radical selected from a hydrogen atom, halogen atom, alkyl or alkoxy radical having 1~3 carbon atoms, cyano radical, or halogenated alkyl or halogenated alkoxy radical having 1~3 carbon atoms wherein hydrogen atoms of the alkyl or alkoxy radical are partly or totally substituted with halogen atoms, m and n are respectively mol % of recurring units, m is 100~70 mol %, n is 0~30 mol %, fixed order or regularity is absent among the recurring units, and l is a polymerization degree and is an integer of 1~100, or linear polyamic acid, the precursor of said linear polyimide, represented by the formula (6):

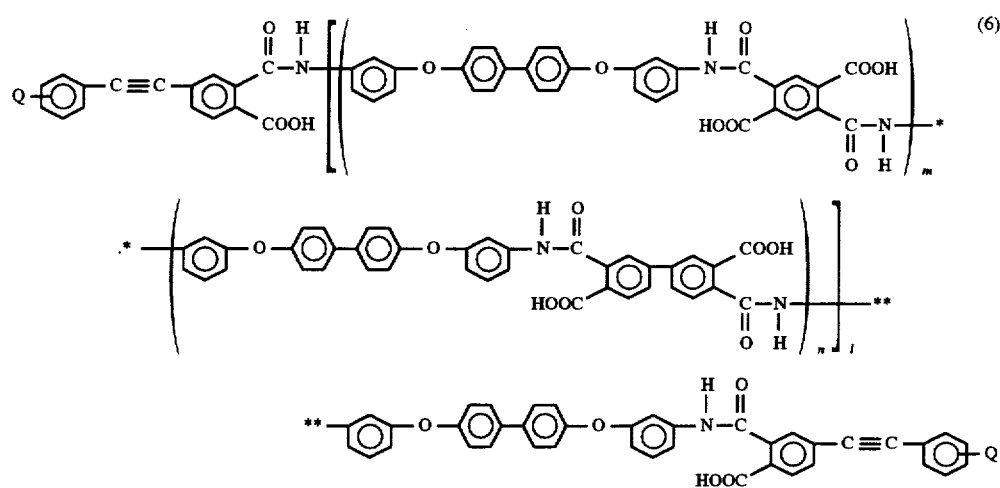

wherein Q, m, n and l are the same as in the formula (5).

Linear polyimide or linear polyamic acid which can be used is more preferably linear polyimide represented by the formula (7):

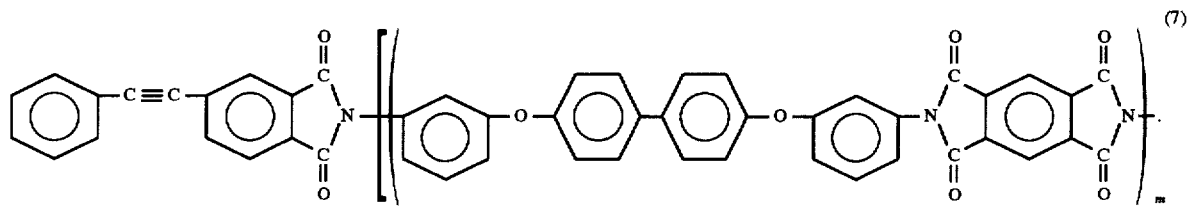

-continued

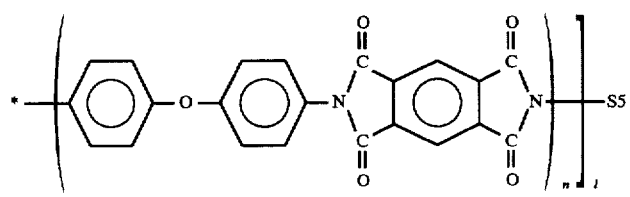

wherein S5 is one or more monovalent radicals of the formula (o) or the formula (p):

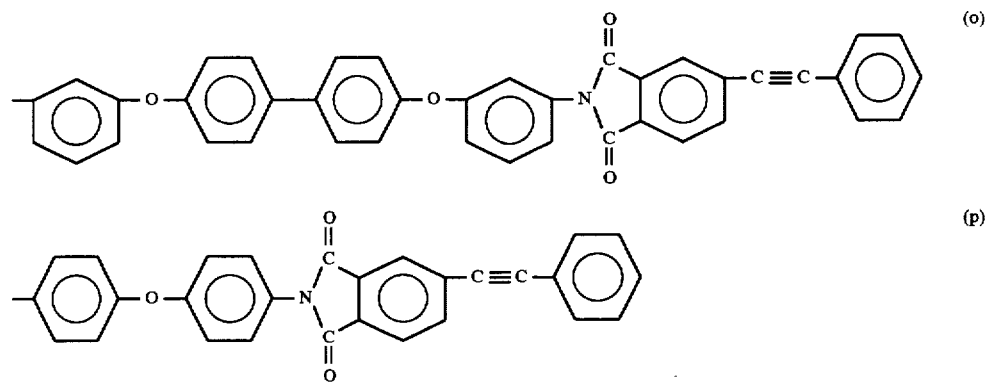

m and n are respectively mol % of recurring units, m is 100~70 mol %, n is 0~30 mol %, fixed order or regularity is absent among the recurring units, and l is a polymerization degree and is as integer of 1~100, or linear polyamic acid, the precursor of said linear polyimide, represented by the formula (8):

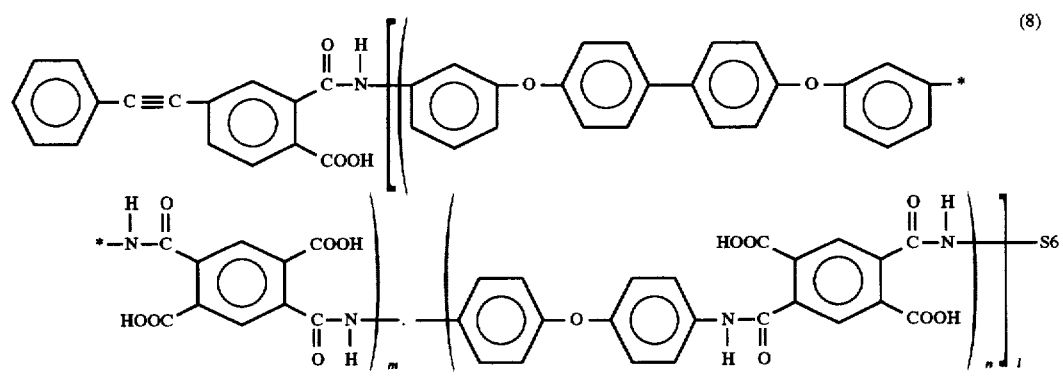

wherein S6 is one or more monovalent radicals of the formula (q) or the formula (r):

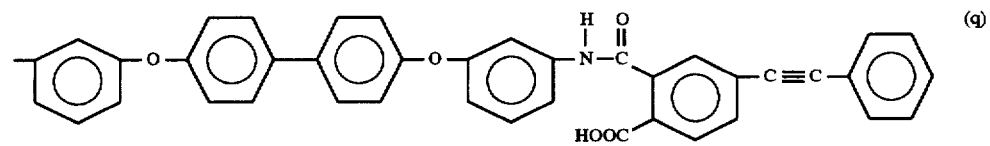

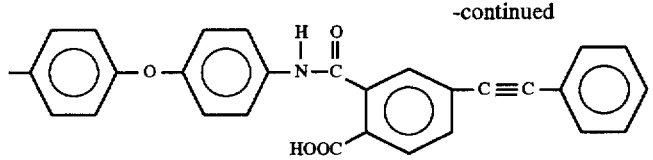

m, n and l are the same as in the formula (7) ; and linear polyimide represented by the formula (9):

Further, the invention includes linear polyimide and linear polyamic acid having a m:n composition ratio of 100 mol %:

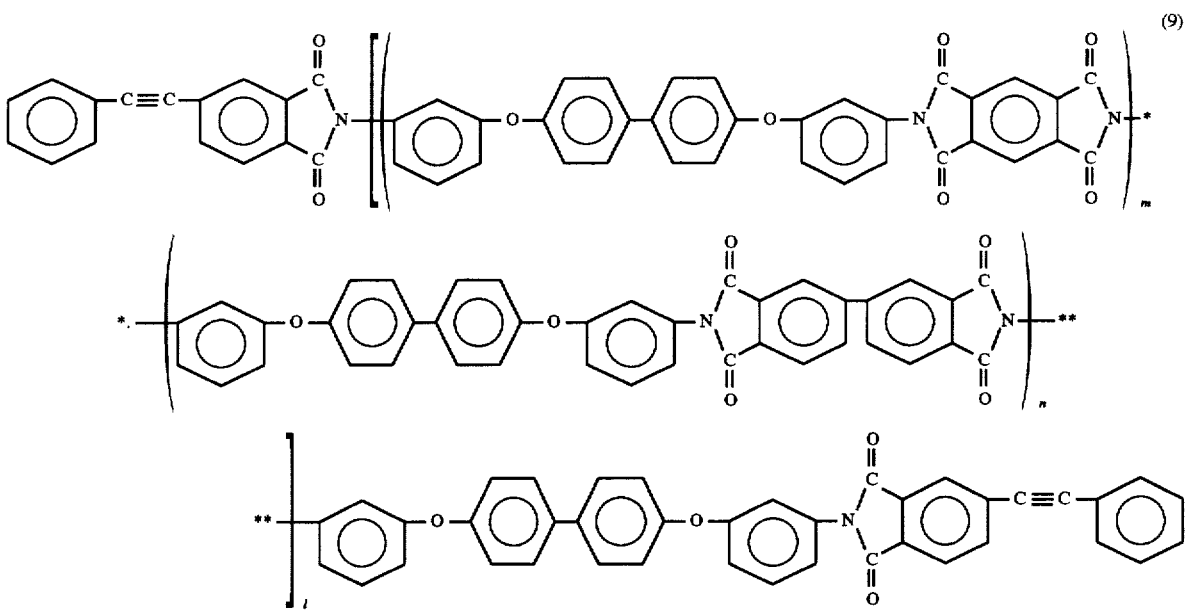

wherein m and n are respectively mol % of recurring units, m is 100~70 mol %, n is 0~30 mol %, fixed order or regularity is absent among the recurring units, and l is a polymerization degree and is an integer of 1~100, or linear polyamic acid, the precursor of said linear polyimide, represented by the formula (10):

0 mol % in each formula above. That is, such compound is linear polyimide represented by the formula (11):

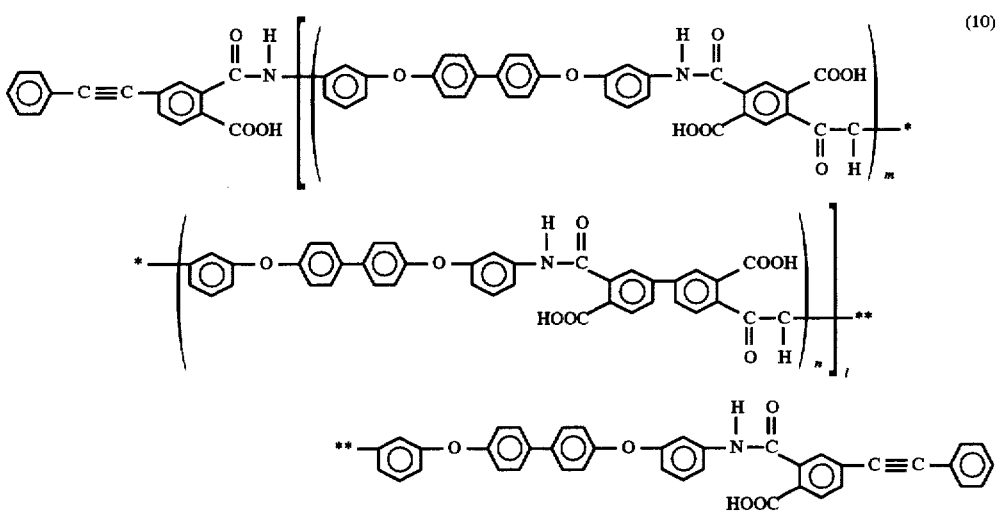

wherein m, n and l are the same as in the formula (9).

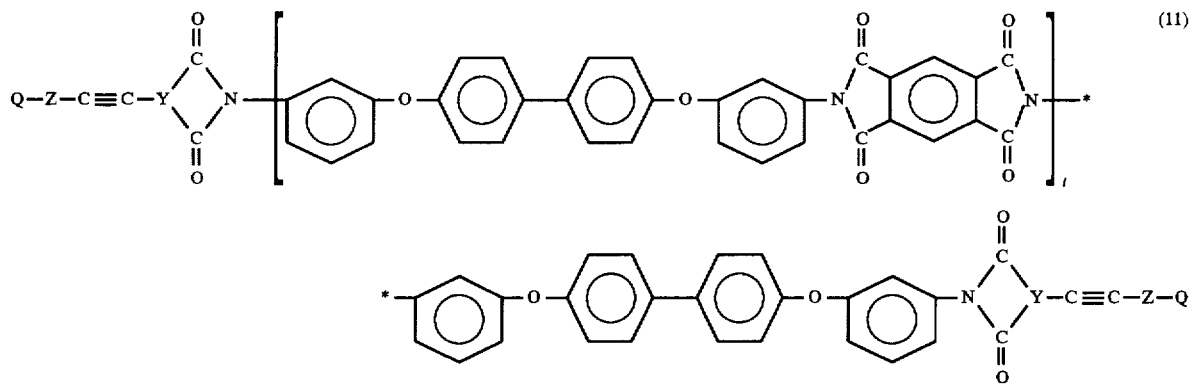

wherein Y and Z are radicals having 6–18 carbon atoms and are respectively selected from a monoaromatic radical, condensed polyaromatic radical or non-condensed aromatic radical connected to each other with a bridge member selected from a direct bond, carbonyl radical, sulfonyl radical, sulfoxide radical, ether radical, isopropylidene radical, hexafluorinated isopropylidene radical or sulfide radical, Y is a trivalent radical, Z is a divalent radical, Q is a monovalent substituent located on an aromatic ring of Z and is selected from a hydrogen atom, halogen atom, alkyl or alkoxy radical having 1–3 carbon atoms, cyano radical, or halogenated alkyl or halogenated alkoxy radical having 1–3 carbon atoms wherein hydrogen atoms of the alkyl or alkoxy radical are partly or totally substituted with halogen atoms, and l is a polymerization degree and is an integer of 1–100, more specifically, linear polyimide which consists of recurring units of the formula (11-1):

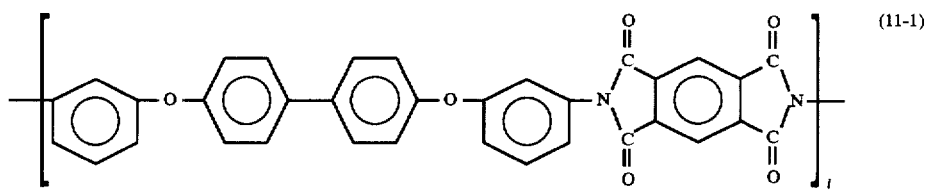

and terminates the molecule with a radical of the formula (11-a) and the formula (11-b):

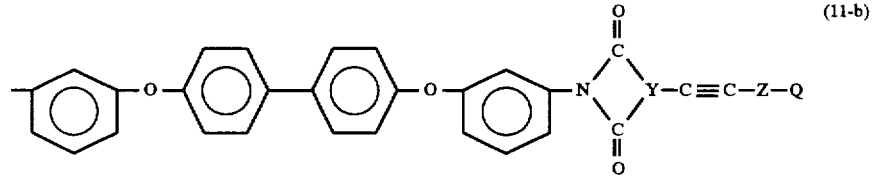

wherein Q, z and Y are the same as in the formula (11), and linear polyamic acid, the precursor of said linear polyimide, represented by the formula (12):

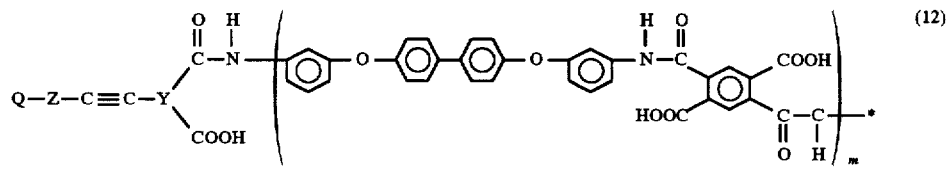

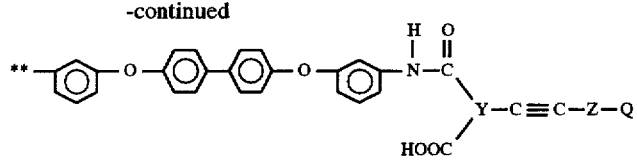

wherein Q, Z, Y and l are the same as in the formula (11), more specifically, linear polyamic acid which consists of recurring units of the formula (12-1):

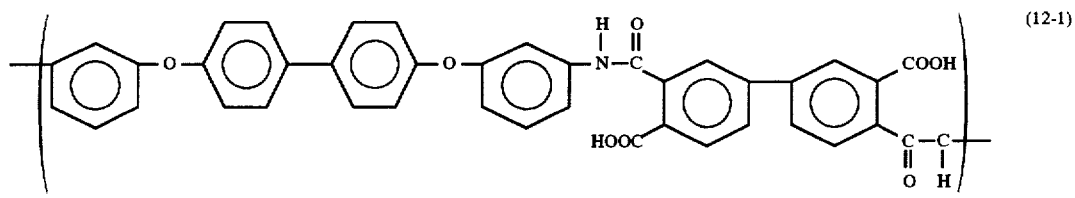

and terminates the molecule with a radical of the formula (12-a) and the formula (12-b)

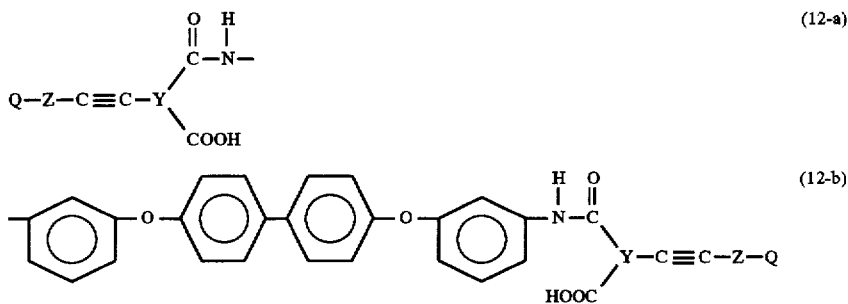

wherein Q, Z and Y are the same as in the formula (11), and further, linear polyimide which terminates the molecule of the formula (11) with a radical of the formula (11-c) and the formula (11-d):

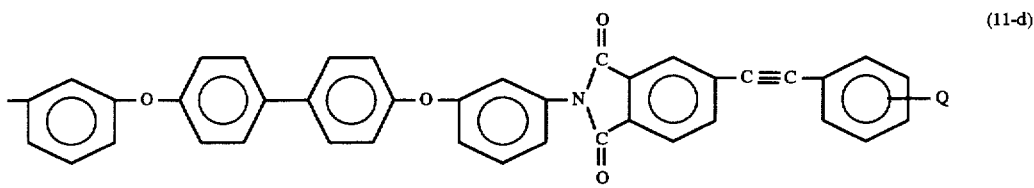

wherein Q is the same as in the formula (11), and linear polyimide acid which terminates the molecule of the formula (12) with a radical of the formula (12-c) and the formula (12-d):

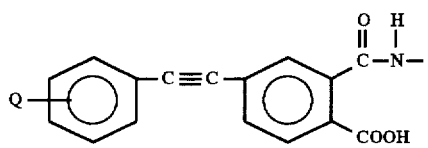 (12-c)

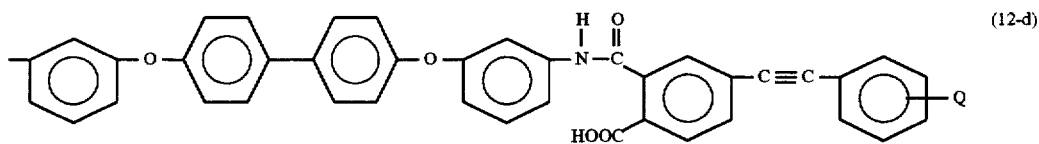 (12-d)

wherein Q is the same as in the formula (12).

Linear polyimide and linear polyamic acid wherein the end radical Q is a hydrogen atom is more preferred.

In the linear polyimide of the invention, the polyamic acid precursor has an inherent viscosity of 0.05~1.0 dl/g. The inherent viscosity is measured at 35° C. in a N,N-dimethylacetamide solvent at a concentration of 0.5 g/dl.

Further, the present invention is thermoset polyimide obtained by heat-treating these preferred linear polyimide and/or linear polyamic acid, a composite material comprising linear polyimide and/or linear polyamic acid and a fibrous reinforcement, and a composite material which is obtained by heat-treating said composite material and comprises thermoset polyimide and the fibrous reinforcement.

Thermoplastic polyimide is excellent in various properties, however, application above the glass transition temperature causes problems. On the other hand, thermosetting polyimide has very excellent heat resistance and can be applied at high temperatures. However, mechanical properties thereof have problems, toughness of particular. Linear polyimide and/or linear polyamic acid of the invention provide thermoset polyimide which can improve the above disadvantages. That is, the thermoset polyimide of the invention enhances heat resistance of thermoplastic polyimide, has essential properties of polyimide, and improves mechanical properties of thermosetting polyimide.

Consequently, the invention can provide various kind of composite materials, for example, a novel material as a aircraft matrix.

DETAILED DESCRIPTION OF THE INVENTION

Linear polyimide and linear polyamic acid of the invention are defined as follows in the specification.

For example, linear polyimide is represented by the formula (1):

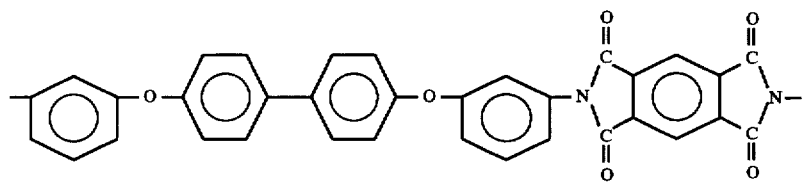 (1)

and P1, S1, Q, Y, Z, m, n and l are defined as above.

Linear polyimide consists of (1) recurring units of the formula (M) and (2) recurring units of the formula (N) or the formula (O):

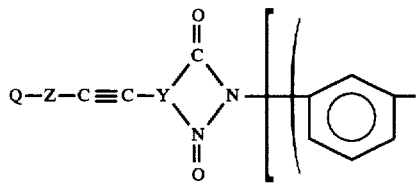 (M)

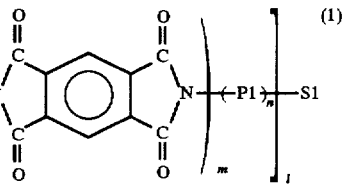

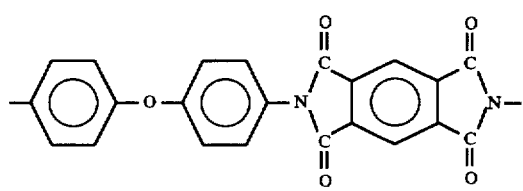 (N)

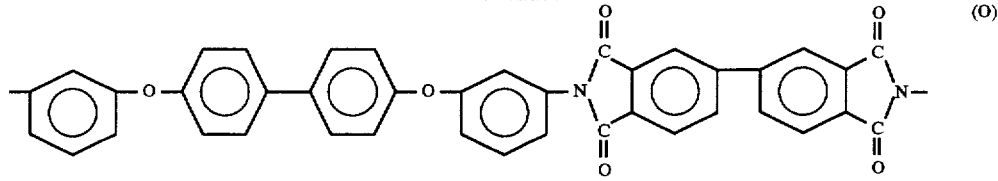

which are specified by P1 in the formula (1), and the composition ratio of the recurring units in the formula (M) to the recurring units in the formula (N) or the formula (O) is indicated by the mol % ratio m:n. That is, the composition ratio of the recurring units in the formula (1) is 100~1 mol % in the recurring units (M) and 0~99 mol % in the recurring units (N) or the recurring units (O).

Linear polyimide has a monovalent radical represented by the formula (P):

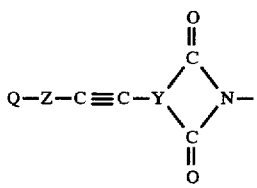

at one end of the molecule and has one or more monovalent radical represented by the formula (U) or the formula (V):

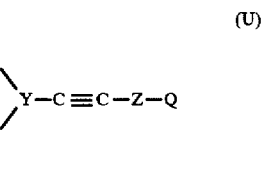

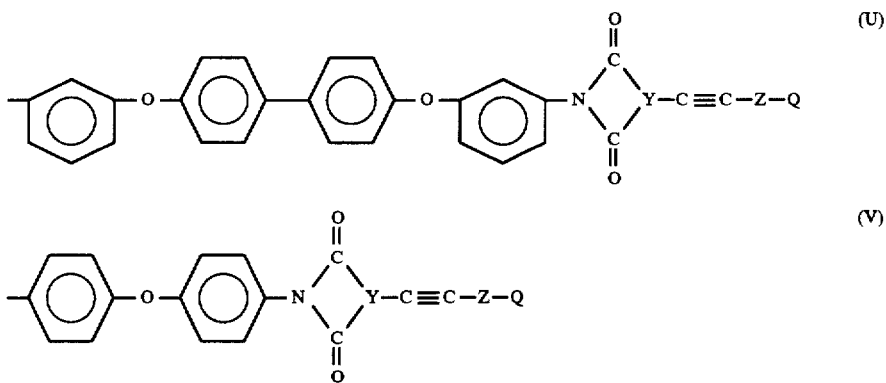

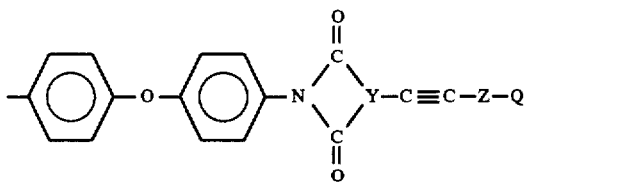

where are specified by S1 in the formula (1). In the formulas (P), (U) and (V), Q, Y and Z are the same as in the formula (1).

Linear polyimide represented by other formulas (3), (5), (7), (9) and (11) in the invention and linear polyamic acid represented by other formulas (4), (6), (8), (10) and (12) respectively have recurring units, composition ratio of recurring units, and linear polyimide radical and linear polyamic acid radical at the end of the molecule which are illustrated in the same way.

Linear polyimide and linear polyamic acid precursor in the specification include polymers which singly consist of the recurring units represented by the formula (M) [formulas (11) and (12) are independently specified] and polymers which have recurring units of the formula (M) as a requisite segment, consists of the two recurring units having the formula (N) or the formula (O) and have a random arrangement of these recurring units.

Linear polyamic acid and linear polyimide of the invention are prepared by the following process.

Essential diamine ingredient and tetracarboxylic dianhydride ingredient are 4,4'-bis(3-aminophenoxy)biphenyl of the above formula (1-1) and pyromellitic dianhydride of the formula (1-3). The diamine ingredient or tetracarboxylic dianhydride which can be used by mixing with the above raw materials is 4,4'-diaminophenyl ether or 3,3',4,4'-biphenyltetracarboxylic dianhydride.

Consequently, linear polyimide or linear polyamic acid of the invention is prepared by using 4,4'-bis(3-aminophenoxy) biphenyl and pyromellitic dianhydride as essential monomers or by adding 4,4'-diaminodiphenyl ether or 3,3',4,4'-biphenyltetracarboxylic dianhydride to the essential monomers.

Specifically, 4,4'-bis(3-aminophenoxy)biphenyl and pyromellitic dianhydride are used in order to prepare linear polyimide of the above formula (11) or linear polyamic acid of the above formula (12).

Further, linear polyimides of the formula (3) and the formula (7) respectively having two kinds of recurring units and linear polyamic acid of the formula (4) and the formula (8) respectively having two kinds of recurring units are prepared from 4,4'-bis(3-aminophenoxy) biphenyl, pyromellitic dianhydride and 4,4'-diaminodiphenyl ether. Linear polyimide of the formula (5) and the formula (9) respectively having two kinds of recurring units and linear polyamic acid of the formula (6) and the formula (10) respectively having two kinds of the recurring units are prepared by using 4,4'-bis(3-aminophenoxy)biphenyl and pyromellitic dianhydride as essential monomers and by adding 3,3',4,4'-biphenyltetracarboxylic dianhydride.

Linear polyimide and linear polyamic acid of the invention are prepared by using the above aromatic diamine as an essential monomer. Other aromatic diamines can be added so long as giving no adverse effect on the good properties of the product.

Diamines which can be added include, for example, m-phenylenediamine, o-phenylenediamine, p-phenylenediamine, m-aminobenzylamine, p-aminobenzylamine, 3,3'-diaminodiphenyl ether, 3,4'-diaminodiphenyl ether, bis(3-aminophenyl)sulfide, bis(4-aminophenyl)sulfide, (3-aminophenyl) (4-aminophenyl) sulfide, bis(3-aminophenyl)sulfoxide, bis(4-aminophenyl) sulfoxide, (3-aminophenyl) (4-aminophenyl)sulfoxide, bis (3-aminophenyl)sulfone, bis(4-aminophenyl)sulfone, (3-aminophenyl) (4-aminophenyl)sulfone, 3,3'-diaminobenzophenone, 4,4'-diaminobenzophenone, 3,4'-diaminobenzophenone, 3,3'-diaminodiphenylmethane, 4,4'-diaminodiphenylmethane, 3,4'-diaminodiphenylmethane, bis[4-(3-aminophenoxy)phenyl]methane, bis[4-(4-aminophenoxy)phenyl]methane, 1,1-bis[4-(3-aminophenoxy)phenyl]ethane, 1,2-bis[4-(3-aminophenoxy)phenyl]ethane, 1,1-bis[4-(4-aminophenoxy)phenyl]ethane, 1,2-bis[4-(4-aminophenoxy)phenyl]ethane, 2,2-bis[4-(3-aminophenoxy)phenyl]propane, 2,2-bis[4-(3-aminophenoxy)phenyl]propane, 2,2-bis[4-(3-aminophenoxy)phenyl]butane, 2,2-bis[3-(3-aminophenoxy)phenyl]-1,1,1,3,3,3-hexafluoropropane, 2,2-bis[4-(4-aminophenoxy)phenyl]-1,1,1,3,3,3-hexafluoropropane, 1,3-bis(3-aminophenoxy)benzene, 1,3-bis(4-aminophenoxy)benzene, 1,4-bis(3-aminophenoxy)benzene, 1,4-bis(4-aminophenoxy)benzene, 4,4'-bis(4-aminophenoxy)biphenyl, bis[4-(3-aminophenoxy)phenyl]ketone, bis[4-(4-aminophenoxy)phenyl]ketone, bis[4-(3-aminophenoxy)phenyl]sulfide, bis[4-(4-aminophenoxy)phenyl]sulfide, bis [4-(3-aminophenoxy)phenyl]sulfoxide, bis[4-(4-aminophenoxy)phenyl]sulfoxide, bis[4-(3-aminophenoxy)phenyl]sulfone, bis[4-(4-aminophenoxy)phenyl]sulfone, bis [4-(3-aminophenoxy)phenyl]ether, bis[4-(4-aminophenoxy)phenyl]ether, 1,4-bis[4-(3-aminophenoxy)benzoyl]benzene, 1,3-bis[4-(3-aminophenoxy)benzoyl]benzene, 4,4'-bis[3-(4-aminophenoxy)benzoyl]diphenyl ether, 4,4'-bis[3-(3-aminophenoxy)benzoyl]diphenyl ether, 4,4'-bis[4-(4-amino-α,α-dimethylbenzyl)phenoxy]benzophenone, 4,4'-bis[4-(4-amino-α,α-dimethylbenzyl)phenoxy]diphenyl sulfone, bis [4-{4-(4-aminophenoxy)phenoxy}phenyl]sulfone, 1,4-bis [4-(4-aminophenoxy)phenoxy-α,α-dimethylbenzyl] benzene, 1,3-bis[4-(4-aminophenoxy)phenoxy-α,α-dimethylbenzyl]benzene, 1,3-bis[4-(4-amino-6-trifluoromethylphenoxy)-α,α-dimethylbenzyl]benzene, 1,3-bis[4-(4-amino-6-fluorophenoxy)-α,α-dimethylbenzyl] benzene, 1,3-bis[4-(4-amino-6-methylphenoxy)-α,α-dimethylbenzyl]benzene, 1,3-bis[4-(4-amino-6-cyanophenoxy)-α,α-dimethylbenzyl]benzene, 3,3'-diamino-4,4'-diphenoxybenzophenone, 4,4'-diamino-5,5'-diphenoxybenzophenone, 3,4'-diamino-4,5'-diphenoxybenzophenone, 3,3'-diamino-4-phenoxybenzophenone, 4,4'-diamino-5-phenoxybenzophenone, 3,4'-diamino-4-phenoxybenzophenone, 3,4'-diamino-5-phenoxybenzophenone, 3,3'-diamino-4,4'-dibiphenoxybenzophenone, 4,4'-diamino-5,5'-dibiphenoxybenzophenone, 3,4'-diamino-4,5'-dibiphenoxybenzophenone, 3,3'-diamino-4-biphenoxybenzophenone, 4,4'-diamino-5-biphenoxybenzophenone, 3,4'-diamino-4-biphenoxybenzophenone, 3,4'-diamino-5'-biphenoxybenzophenone, 1,3-bis(3-amino-4-phenoxybenzoyl)benzene, 1,4-bis(3-amino-4-phenoxybenzoyl)benzene, 1,3-bis(4-amino-5-phenoxybenzoyl)benzene, 1,4-bis(4-amino-5-phenoxybenzoyl)benzene, 1,3-bis(3-amino-4-biphenoxybenzoyl)benzene, 1,4-bis(3-amino-4-biphenoxybenzoyl)benzene, 1,3-bis(4-amino-5-biphenoxybenzoyl)benzene, 1,4-bis(4-amino-5-biphenoxybenzoyl)benzene, 2,6-bis[4-(4-amino-α,α-dimethylbenzyl)phenoxy]benzonitrile, and the above diamines wherein hydrogen atoms on the aromatic ring are partly or totally substituted with a halogen atom, alkyl or alkoxy radical having 1~3 carbon atoms, cyano radical, or halogenoalkyl or halogenoalkoxy radical of 1~3 carbon atoms wherein hydrogen atoms on the radical are partly or totally substituted with halogen atoms. These aromatic diamines can be used singly or as a mixture.

Similarly, other aromatic tetracarboxylic dianhydrides can also be added. Exemplary aromatic tetracarboxylic dianhydrides which can be added includes 3,3',4,4'-benzophenonetetracarboxylic dianhydride, 2,2',3,3'-benzophenonetetracarboxylic dianhydride, 2,2',3,3'-biphenyltetracarboxylic dianhydride, 2,2-bis(2,3-dicarboxyphenyl)propane dianhydride, bis(3,4-dicarboxyphenyl)ether dianhydride, bis(3,4-dicarboxyphenyl) sulfone dianhydride, 1,1-bis(2,3-dicarboxyphenyl)ethane dianhydride, bis(2,3-dicarboxyphenyl)methane dianhydride, bis(3,4-dicarboxyphenyl)methane dianhydride, 2,2-bis(3,4'-dicarboxyphenyl)-1,1,1,3,3,3-hexafluoropropane dianhydride, 2 3,6,7-naphthalenetetracarboxylic dianhydride, 1,4,5,8-naphthalenetetracarboxylic dianhydride, 1,2,5,6-naphthalenetetracarboxylic dianhydride, 1,2,3,4-benzenetetracarboxylic dianhydride, 3,4,9,10-perylenetetracarboxylic dianhydride, 2,3,6,7-anthracenetetracarboxylic dianhydride, 1,2,7,8-phenanthrene tetracarboxylic dianhydride, and the above aromatic tetracarboxylic dianhydrides wherein hydrogen atoms on the aromatic ring are partly or totally substituted with a halogen atom or halogenoalkyl or halogenoalkoxy radical having 1~3 carbon atoms. These dianhydrides can be used singly or as a mixture.

The amount of the aromatic diamine ingredient and tetracarboxylic dianhydride ingredient in the preparation of linear polyimide or linear polyamic acid of the invention is 0.1~1.0 mole of aromatic tetracarboxylic dianhydride ingredient for one mole of aromatic diamine ingredient.

When the mole ratio is less than 0.1, linear polyimide obtained cannot provide thermoset polyimide having good properties. The mole ratio is preferably 0.5~1.0, more preferably 0.7~1.0.

When the diamine ingredient is composed of two kinds of diamine, that is, 4,4'-bis(3-aminophenoxy)biphenyl and 4,4'-diaminodiphenyl ether, the ratio of 4,4'-bis(3-aminophenoxy)biphenyl: 4,4'-diaminodiphenyl ether is 100~1 mol %: 0~99 mol %, preferably 100~70 mol %: 0~30 mol %. When the tetracarboxylic dianhydride ingredient is composed of two kinds of aromatic tetracarboxylic dianhydride, that is, pyromellitic dianhydride and 3,3',4,4'-biphenyltetracarboxylic dianhydride, the ratio of pyromellitic dianhydride: 3,3',4,4'-biphenyltetracarboxylic dianhydride is 100~1 mol %: 0~99 mol %, preferably 100~50 mol %.

Aromatic dicarboxylic anhydride which has a carbon-carbon triple bond and is represented by the formula (1-5):

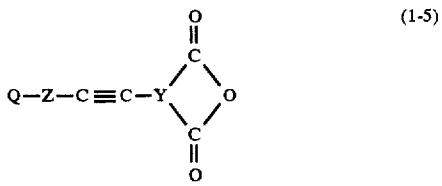

(1-5)

wherein Q, Y and Z are same as above, is used in order to cap the linear polyimide or linear polyamic acid of the invention at the end of the molecule with a terminal radical having a carbon-carbon triple bond.

Aromatic dicarboxylic anhydrides which have a carbon-carbon triple bond and can be used for the invention include, for example, 1-phenyl-2-(3,4-dicarboxyphenyl)acetylene anhydride, 1-phenyl-2-[h-(3,4-dicarboxyphenoxy)phenyl] acetylene anhydride, 1-phenyl-2-[h-(3,4- dicarboxycarbonyl)phenyl]acetylene anhydride, 1-phenyl-2-[h-(3,4-dicarboxyphenylsulfonyl)phenyl]acetylene anhydride, 1-phenyl-2-[h-(3,4-dicarboxyphenylsulfinyl) phenyl]acetylene anhydride, 1-phenyl-2-[h- {2-(3,4-dicarboxyphenyl)isopropanyl}phenyl]acetylene anhydride, 1-phenyl-2-[h- {1,1,1,3,3,3-hexafluoro-2-(3,4-dicarboxyphenyl)isopropanyl}phenyl]acetylene anhydride, 1-phenyl-2-[h-(3,4-dicarboxyphenyl)phenyl]acetylene anhydride, 1-phenyl-2-[h-(s,t-dicarboxy)naphthyl]acetylene anhydride, 1-(g-phenoxyphenyl-2-(3,4-dicarboxyphenyl) acetylene anhydride, 1-(g-phenoxyphenyl-2-[h-(3,4-dicarboxyphenoxy)phenyl]acetylene anhydride, 1-(g-phenoxyphenyl-2-[h-(3,4-dicarboxyphenylcarbonyl) phenyl]acetylene anhydride, 1-(g-phenoxyphenyl-2-[h-(3,4-dicarboxyphenylsulfonyl)phenyl]acetylene anhydride, 1-(g-phenoxyphenyl)-2-[h-(3,4-dicarboxyphenylsulfinyl)phenyl] acetylene anhydride, 1-(g-phenoxyphenyl)-2-[h-{2-(3,4-dicarboxyphenyl)isopropanyl}phenyl]acetylene anhydride, 1-(g-phenoxyphenyl)-2-[h-{1,1,1,3,3,3-hexafluoro-2-(3,4-dicarboxyphenyl)isopropanyl}phenyl]acetylene anhydride, 1-(g-phenoxyphenyl)-2-[h-3,4-dicarboxyphenyl)phenyl] acetylene anhydride,1-(g-phenoxyphenyl)-2-[h-(s,t-dicarboxy)naphthyl]acetylene anhydride, 1-(g-phenylphenyl)-2-(3,4-dicarboxyphenyl)acetylene anhydride, 1-(g-phenylphenyl)-2-[h-(3,4-dicarboxyphenoxy)phenyl]acetylene anhydride, 1-(g-phenylphenyl)-2-[h-3,4-dicarboxyphenylcarbonyl)phenyl] acetylene anhydride, 1-(g-phenylphenyl)-2-[h-(3,4-dicarboxyphenylsulfonyl)phenyl]acetylene anhydride, 1-(g-phenylphenyl)-2-[h-(3,4-dicarboxyphenylsulfinyl)phenyl] acetylene anhydride, 1-(g-phenylphenyl)-2-[h-{2-(3,4-dicarboxyphenyl)isopropanyl}phenyl]acetylene anhydride, 1-(g-phenylphenyl)-2-[h-{2-(3,4-dicarboxyphenyl) isopropanyl}phenyl]acetylene anhydride, 1-(g-phenylphenyl)-2-[h-{1,1,1,3,3,3-hexafluoro-2-(3,4-dicarboxyphenyl) isopropanyl}phenyl]acetylene anhydride, 1-(g-phenylphenyl)-2-[h-(3,4-dicarboxyphenyl)phenyl] acetylene anhydride,1-(g-phenylphenyl)-2-[h-(s,t-dicarboxy)naphthyl]acetylene anhydride, 1-[g-(phenylcarbonyl)phenyl]-2-(3,4-dicarboxyphenyl)acetylene anhydride,1-[g-(phenylcarbonyl)phenyl]-2-[h-(3,4-dicarboxyphenoxy)phenyl]acetylene anhydride, 1-[g-(phenylcarbonyl)phenyl]-2-[h-(3,4-dicarboxyphenylcarbonyl)phenyl]acetylene anhydride, 1-[g-(phenylcarbonyl)phenyl]-2-[h-(3,4-dicarboxyphenylsulfonyl)phenyl]acetylene anhydride, 1-[g-(phenylcarbonyl)phenyl]-2-[h-(3,4-dicarboxyphenylsulfinyl)phenyl]acetylene anhydride, 1-[g-(phenylcarbonyl)phenyl]-2-[h-{2-(3,4-dicarboxyphenyl) isopropanyl}phenyl]acetylene anhydride, 1-[g-(phenylcarbonyl)phenyl]-2-[h-{1,1,1,3,3,3-hexafluoro-2-(3, 4-dicarboxyphenyl)isopropanyl}phenyl]acetylene anhydride, 1-[g-(phenylcarbonyl)phenyl]-2-[h-(3,4-dicarboxyphenyl)phenyl]acetylene anhydride, 1-[g-(phenylcarbonyl)phenyl]-2-[h-(s,t-dicarboxy(naphthyl) acetylene anhydride, 1-[g-(phenylsulfonyl)phenyl]-2-[3,4-dicarboxyphenyl]acetylene anhydride,1-[g-(phenylsulfonyl)phenyl]-2-[h-(3,4-dicarboxyphenoxy) phenyl]acetylene anhydride, 1-[g-(phenylsulfonyl)phenyl]-2-[h-(3,4-dicarboxyphenylcarbonyl)phenyl]acetylene anhydride, 1-[g-(phenylsulfonyl)phenyl]-2-[h-(3,4-dicarboxyphenylsulfonyl)phenyl]acetylene anhydride, 1-[g-(phenylsulfonyl)phenyl]-2-[h-(3,4-dicarboxyphenylsulfinyl)phenyl]acetylene anhydride, 1-[g-(phenylsulfonyl)phenyl]-2-[h-{2-(3,4-dicarboxyphenyl) isopropanyl}phenyl]acetylene anhydride, 1-[g-(phenylsulfonyl)phenyl]-2-[h-{1,1,1,3,3,3-hexafluoro-2-(3, 4-dicarboxyphenyl)isopropanyl}phenyl]acetylene anhydride, 1-[g-(phenylsulfonyl)phenyl]-2-[h-(3,4-dicarboxyphenyl)phenyl]acetylene anhydride, 1-[g-(phenylsulfonyl)phenyl]-2-[h-(s,t-dicarboxy)naphthyl] acetylene anhydride, 1-[g-(phenylsulfinyl)phenyl]-2-(3,4-dicarboxyphenyl)acetylene anhydride,1-[g-(phenylsulfinyl) phenyl]-2-[h-(3,4-dicarboxyphenyl) phenyl]acetylene anhydride, 1-[g-(phenylsulfinyl)phenyl]-2-[h-(3,4-dicarboxyphenoxy)phenyl]acetylene anhydride, 1-[g-(phenylsulfinyl)phenyl]-2-[h-(3,4-dicarboxyphenylcarbonyl)phenyl]acetylene anhydride, 1-[g-(phenylsulfinyl)phenyl]-2-[h-(3,4-dicarboxyphenylsulfonyl)phenyl]acetylene anhydride, 1-[g-(phenylsulfinyl)phenyl]-2-[h-(3,4-dicarboxyphenylsulfinyl) phenyl]acetylene anhydride, 1-[g-(phenylsulfinyl)phenyl]-2-[h-{2-(3,4-dicarboxyphenyl)isopropanyl}phenyl] acetylene anhydride, 1-[g-(phenylsulfinyl)phenyl]-2-[h-{1, 1,1,3,3,3-hexafluoro-2-(3,4-dicarboxyphenyl) isopropanyl}phenyl]acetylene anhydride, 1-[g-(phenylsulfinyl)phenyl]-2-[h-(3,4-dicarboxyphenyl)phenyl] acetylene anhydride, 1-[g-(phenylsulfinyl)phenyl]-2-[h-(s,t-dicarboxynaphthyl]acetylene anhydride, 1-[g-(phenylisopropanyl)phenyl]-2-(3,4-dicarboxyphenyl) acetylene anhydride, 1-[g-(2-phenylisopropanyl)phenyl]-2-[h-(3,4-dicarboxyphenoxy)phenyl]acetylene anhydride, 1-[g-(phenylisopropanyl)phenyl]-2-[h-(3,4-dicarboxyphenylcarbonyl)phenyl]acetylene anhydride, 1-[g-(2-phenylisopropanyl)phenyl]-2-[h-(3,4-dicarboxyphenylsulfonyl)phenyl]acetylene anhydride, 1-[g-(phenylisopropanyl)phenyl]-2-[h-(3,4-dicarboxyphenylsulfinyl)phenyl]acetylene anhydride, 1-[g-(2-phenylisopropanyl)phenyl]-2-[h-{2-(3,4-dicarboxyphenyl)isopropanyl}phenyl]acetylene anhydride, 1-[g-(phenylisopropanyl)phenyl]-2-[h-{1,1,1,3,3,3-hexafluoro-2-(3,4-dicarboxyphenyl)isopropanyl}phenyl] acetylene anhydride, 1-[g-(phenylisopropanyl)phenyl]-2-[h-(3,4-dicarboxyphenyl)phenyl]acetylene anhydride, 1-[g-2-phenylisopropanyl)phenyl]-2-[h-(s,t-dicarboxynaphthyl] acetylene anhydride, 1-[g-1,1,1,3,3,3-hexafluoro-2-phenylisopropanyl)phenyl]-2-[h-(3,4-dicarboxyphenyl) phenyl]acetylene anhydride, 1-[g-1,1,1,3,3 3-hexafluoro-2-phenylisopropanyl)phenyl]-2-[h-(3,4-dicarboxyphenyl) phenyl]acetylene anhydride, 1-[g-1,1,1,3,3 3-hexafluoro-2-phenylisopropanyl)phenyl]-2-[h-(3,4-dicarboxyphenylcarbonyl)phenyl]acetylene anhydride, 1-[g-1,1,1,3,3 3-hexafluoro-2-phenylisopropanyl)phenyl]-2-[h-(3,4-dicarboxyphenylsulfonyl)phenyl]acetylene anhydride, 1-[g-1,1,1,3,3 3-hexafluoro-2-phenylisopropanyl)phenyl]-2-[h-(3,4-dicarboxyphenylsulfinyl)phenyl]acetylene anhydride, 1-[g-1,1,1,3,313-hexafluoro-2-phenylisopropanyl)phenyl]-2-[h-{2-(3,4-dicarboxyphenyl)isopropanyl}phenyl]acetylene anhydride, 1-[g-1,1,1,3,3,3-hexafluoro-2-phenylisopropanyl)phenyl]-2-[h-{1,1,1,3,3,3-hexafluoro-2-(3,4-dicarboxyphenyl)isopropanyl}phenyl]acetylene anhydride, 1-[g-(1,1,1,3,3,3-hexafluoro-2-phenylisopropanyl)phenyl]-2-[h-(3,4-dicarboxyphenyl) phenyl]acetylene anhydride, 1-[g-(1,1,1,3,3,3-hexafluoro-2-phenylisopropanyl)phenyl]-2-[h-(s,t-dicarboxy)naphthyl] acetylene anhydride, and these aromatic dicarboxylic anhydrides wherein the hydrogen atoms on the aromatic ring are partly or totally substituted with a fluorine atom, chlorine atom, bromine atom, iodine atom, methyl radical, ethyl radical, propyl radical, isopropyl radical, methoxy radical, ethoxy radical, propoxy radical, isopropoxy radical and halogenated alkyl or halogenated alkoxy radical wherein hydrogen atoms on these alkyl or alkoxy radicals are partly or totally substituted with halogen atoms such as fluorine, chlorine, bromine or iodine. In the names of the above aromatic dicarboxylic anhydride, g is an integer of 2, 3 or 4; h is an integer of 2, 3 or 4; s is an integer of 1~7; t is an integer of 2~8 and t=s+1; and s and t differ from h. No particular restriction is imposed upon the kind and numbers of substituents on the aromatic ring of these aromatic dicarboxylic anhydrides. These aromatic dicarboxylic anhydrides can be used singly or as a mixture.

In these aromatic dicarboxylic anhydrides, 1-substituted-phenyl-2-(3,4-dicarboxyphenyl)acetylene anhydride, for example, 1-methylphenyl-2-(3,4-dicarboxyphenyl) acetylene anhydride is preferably used. Further, 1-phenyl-2-(3,4-dicarboxyphenyl)acetylene anhydride is most preferred in view of properties and practical uses of thermoset polyimide obtained.

The amount of aromatic dicarboxylic anhydride is 0.001~1.0 mole for one mole of the aromatic diamine ingredient. When the amount is less than 0.001 mole, the crosslinking reaction is insufficient in the heat treatment of linear polyimide and the properties of thermoset polyimide obtained is unsatisfactory. On the other hand, the amount exceeding 1.0 mole lowers mechanical strengths of resultant thermoset polyimide. Thus, the preferred amount is in the range of 0.01~0.5 mole.

The above aromatic dicarboxylic anhydride can be portionally substituted with other aromatic dicarboxylic anhydride in the range giving no adverse effect on the properties of the thermoset polyimide of the invention. Other aromatic dicarboxylic anhydrides which can be used for the substitution include, for example, phthalic acid, 2,3-benzophenonedicarboxylic anhydride, 3,4-benzophenonedicarboxylic anhydride, 2,3-dicarboxyphenylphenylether anhydride, 3,4-dicarboxyphenylphenylether anhydride, 2,3-biphenyldicarboxylic anhydride, 3,4-biphenyldicarboxylic anhydride, 2,3-dicarboxyphenylphenylsulfone anhydride, 3,4-dicarboxyphenylphenylsulfone anhydride, 2,3-dicarboxyphenylphenylsulfide anhydride, 3,4-dicarboxyphenylphenylsulfide anhydride, 1,2-naphthalenedicarboxylic anhydride, 2,3-naphthalenedicarboxylic anhydride, 1,8-naphthalenedicarboxylic anhydride, 1,2-anthracenedicarboxylic anhydride, 2,3-anthracenedicarboxylic anhydride, and 1,9-anthracenedicarboxylic anhydride. These aromatic dicarboxylic anhydrides can be used singly or as a mixture.

Methods for adding and reacting the aromatic dicarboxylic anhydride include:

(1) a method for reacting aromatic tetracarboxylic dianhydride with aromatic diamine and successively adding and reacting aromatic dicarboxylic anhydride, (2) a method for reacting aromatic diamine with aromatic dicarboxylic anhydride and thereafter adding aromatic tetracarboxylic dianhydride to continue the reaction, and (3) a method for simultaneously adding aromatic tetracarboxylic dianhydride, aromatic diamine and aromatic dicarboxylic anhydride and carrying out the reaction.

Any method of addition can be carried out.

No particular restriction is imposed upon the preparation of linear polyimide or linear polyamic acid of the invention. Any known process can be applied.

In the preparation, linear polyimide represented by the formula (1) can contain a portion of its precursor, that is, linear polyamic acid represented by the formula (2).

The reaction is usually carried out in an organic solvent. Representative organic solvents which can be used include, for example, N,N-dimethylacetamide, N,N-dimethylformamide, N,N-diethylacetamide, N,N-dimethoxyacetamide, N-methyl-2-pyrrolidone, 1,3-dimethyl-2-imidazolidinone, N-methylcaprolactam, 1,2-dimethoxyethane, bis(2-methoxyethyl)ether, 1,2-bis(2-methoxyethoxy)ethane, bis[2-(2-methoxyethoxy)ethyl] ether, tetrahydrofuran, 1,3-dioxane, 1,4-dioxane, pyrroline, picoline, dimethyl sulfoxide, dimethyl sulfone, tetramethylurea, hexamethylphosphoramide, sulfolane, phenol, o-cresol, m-cresol, p-cresol, m-cresylic acid, p-chlorophenol, anisole, benzene, toluene and xylene. These solvents can be used singly or as a mixture.

The above aromatic tetracarboxylic dianhydride is reacted in the organic solvent with aromatic diamine and aromatic dicarboxylic anhydride to obtain linear polyamic acid of the formula (2) which is the corresponding precursor of linear polyimide represented by the formula (1) in the invention. No particular limitation is put upon the temperature, time and other reaction conditions. Any known reaction conditions can be applied.

Linear polyamic acid represented by the formula (2) has an inherent viscosity in the range of 0.05~1.0 dl/g which is measured at 35° C. in N,N-dimethylacetamide at a concentration of 0.5 g/dl. When the inherent viscosity is less than 0.05 dl/g, the thermoset polyimide obtained after heat treatment in the invention extremely lowers mechanical properties. On the other hand, when the inherent viscosity exceeds 1.0 dl/g, thermoset polyimide cannot be obtained even though heat treatment is carried out sufficiently.

Successively, linear polyamic acid obtained is thermally or chemically imidized to provide corresponding linear polyimide. Chemical imidization is a process for chemically imidizing polyamic acid by using a dehydrating agent such as acetic anhydride, trifluoroacetic anhydride, polyphosphoric acid, phosphorus pentaoxide and thionyl chloride. Chemical imidization can be carried out in the presence of an organic base such as pyridine, imidazole, picoline and isomers thereof, quinoline and isomers thereof and alkylamines represented by triethylamine or an inorganic base such as sodium hydroxide and potassium hydroxide. Thermal imidization is a process for carrying out imidization by heating a solution containing polyamic acid formed by the reaction. Thermal imidization can also be carried out in the presence of the base similarly to the chemical imidization.

Reaction temperature in the imidization is 0°~400° C. Chemical imidization is preferably carried out in the range of 0°~150° C., and thermal imidization is preferably carried out in the range of 150°~350° C. No particular limitation is imposed upon the reaction pressure. The reaction can be satisfactorily carried out at atmospheric pressure. Reaction time differs depending upon kind of the solvent, reaction temperature and imidization process. Reaction time of 0.1~48 hours is usually sufficient in the invention.

Linear polyamic acid and linear polyimide of the invention can be prepared by the above processes.

Thermoset polyimide of the invention can be prepared by heat-treating the above obtained linear polyimide, linear polyamic acid or a mixture thereof.

That is, linear polyimide of the invention is used for preparing thermoset polyimide. A portion of linear polyimide can be the precursor thereof, that is, linear polyamic acid. Further, thermal crosslinking reaction and thermal imidization can also be carried out at the same time by heat-treating linear polyamic acid of the invention as intact.

Heat treatment temperature differs depending upon the kind of the linear polyimide or linear polyamic acid and aromatic dicarboxylic anhydride of the above formula (1-5), and is in the range of usually 200°–500° C., preferably 250°–450° C., more preferably 350°–400° C. When the temperature is lower than 200° C., the crosslinking reaction is difficult to progress. On the other hand, a temperature exceeding 500° C. leads to deterioration of the linear polyimide or linear polyamic acid and cannot provide thermoset polyimide having satisfactory properties.

Heat treatment time differs depending upon the kind of the linear polyimide or linear polyamic acid and aromatic dicarboxylic anhydride and heat treatment temperature. Heat treatment time is usually in the range of from 0.1 minute to 24 hours, preferably from 1 minutes to 1 hours, more preferably 5–30 minutes. A time shorter than 0.1 minute does not sufficiently progress the crosslinking reaction and thus thermoset polyimide cannot be obtained. On the other hand, a heat treatment longer than 24 hours leads to deterioration of thermoset polyimide obtained, and thus good properties of thermoset polyimide cannot be obtained. No particular limitation is imposed upon the heat treatment pressure. Heat treatment can be satisfactorily carried out at atmospheric pressure.

Reaction velocity can be controlled by acceleration or inhibition of the heat-crosslinking reaction in the presence of a metal catalyst containing gallium, germanium, indium or lead; a transition metal catalyst containing molybdenum, manganese, nickel, cadmium, cobalt, chromium, iron, copper, tin or platinum; or a phosphorus compound, silicon compound, nitrogen compound or sulfur compound.

In order to achieve the same object as above, infrared rays, ultraviolet rays, radiation such as $\alpha$, $\beta$ and $\gamma$ rays, electron rays or X-rays can be irradiated. Further, plasma treatment or doping treatment can also be carried out.

No particular restriction is imposed upon the morphology of linear polyimide or linear polyamic acid in the heat treatment. Linear polyimide or linear polyamic acid obtained can be subjected to heat treatment after converting into a solid such as powder, granule and block, or suspension or solution. In the case of a solid, formed items of various shapes, for example, a film, sheet and filament can be obtained according to the demand. In these cases, fusion, extrusion, sintering, blow forming, calendering and other processing methods can be applied. When a solvent is used, shapes similar to the case of a solid can be obtained by processing with solvent removal.

The product obtained in the form of a solid such as powder, granule and block, or suspension or solution can also be heat-treated after mixing or impregnating with carbon fiber, glass fiber and other various inorganic fibers; aromatic fiber, heterocyclic polymer fiber and other various chemical fibers; and textiles and paper sheets prepared from fibers.

The product can also be heat-treated after coating on a plate, foil or bar consisting of metal, ceramic, plastic or glass. Further, the product can be coated on the same or different kind of substrate, and the coated substrate can be stacked subjected to heat treatment and adhesion at the same time. Adhesion is preferably carried out under pressure.

The thermoset polyimide of the invention can be blended in the form of linear polyimide or linear polyamic acid with thermoplastic resin or other thermosetting resin in the range giving no adverse effect on the object of the invention. Exemplary thermoplastic resin includes, for example, polyethylene, polypropylene, polyvinyl chloride, polyvinylidene chloride, polybutadiene, polystyrene, polyvinyl acetate, ABS resin, polybutylene terephthalate, polyethylene terephthalate, polyphenylene oxide, polycarbonate, PTFE, celluloid, polyarylate, polyethernitrile, polyamide, polysulfone, polyether ketone, polyphenyl sulfide, polyamideimide, polyetherimide, modified polyphenylene oxide, and polyimide. Other thermosetting resins which can be used include, for example, thermosetting polybutadiene, formaldehyde resin, amino resin, polyurethane, silicone resin, SBR, NBR, unsaturated polyester, epoxy resin, polycyanate and phenolic resin. These resins can be used singly or as a mixture in a suitable amount depending upon the object. No particular restriction is put upon the blending method. The thermosetting polyimide of the invention can also be used as a mixture of suitable amounts depending upon the object. Further, the above resin can be added singly or as a mixture to the mixed thermosetting polyimide in the range not impairing the object of the invention.

Further, additives can be used in the range giving no adverse effect on the object of the invention. Exemplary additives include graphite, carborundum, silica powder, molybdenum disulfide, fluoro-resin and other abrasion resistance improvers; glass fiber, carbon fiber and other reinforcements; antimony trioxide, magnesium carbonate, calcium carbonate and other flame retardance improvers; clay, mica and other electrical property improvers; asbestos, silica, graphite and other tracking resistance improvers; barium sulfate, silica, calcium metasilicate and other acid resistance improvers; iron powder, zinc powder, aluminum powder, copper powder and other thermal conductivity improvers; and miscellaneous materials such as glass beads, glass spheres, talc, diatomaceous earth, alumina, silicate balloons, hydrated alumina, metal oxide and colorant.

The composite material of the invention is a composition before heat treatment which comprises linear polyimide and/or linear polyamic acid of the invention and fibrous reinforcement, or a thermoset polyimide composite which contains thermoset polyimide obtained by heat-treating the composition and the fibrous reinforcement.

Exemplary fibrous reinforcements which can be used for the composite material of the invention include yarn and roving of glass fiber, tow of carbon fiber and other unidirectional long fibers; and two dimensional or three dimensional, multidirectional continuous fibrous materials such as textile, mat and felt.

These fibrous reinforcements are constituted of E-glass, S-glass, T-glass, C-glass, AR-glass and other glass fibers; PAN-type, pitch-type or rayon-type carbon fiber; graphite fiber, aromatic polyamide fiber represented by Kevler of Du Pont, silicon carbide fiber such as Nicalon of Nippon Carbon Co., stainless steel fiber and other metal fiber, alumina fiber and boron fiber. These fibers can be used singly or as a combination and can also be used, when necessary, in combination with other reinforcements such as potassium titanate fiber, mica and calcium silicate. Mixing ratio is not limited in particular and is determined depending upon the properties required.

When the fibrous reinforcement to be used for the invention is selected from the above various reinforcements, the reinforcement must be selected so as to meet required properties of the composite material on the basis of the filament properties such as strength, elastic modulus, elongation at break and other mechanical properties, electrical properties and specific gravity. For example, when high values are required for specific strength and specific elastic modulus, carbon fiber or glass fiber must be selected. When electromagnetic wave shielding properties are required, carbon fiber and metal fiber are preferably used. When electric insulation properties are required, glass fiber is suited in particular.

Fiber sizes and collection numbers of the fibrous reinforcement differ depending upon the kind of the fibrous reinforcement used. For example, carbon fiber has generally a fiber size of 4~8 μm and a collection number of 1,000~12,000. Fiber sizes are preferred for the fiber in view of mechanical properties of the composite material obtained. However, various kinds of fibers can be used other than those specified here. Further, no restriction is imposed upon the weaving and thickness of textiles. Any kind of textiles can be used.

Similar to the case of carbon fiber, no particular restriction is imposed upon the kind and shape of other fibrous reinforcement. Surface treatment of the fibrous reinforcement is preferred in view of improving adhesion to the matrix resin, and known surface treatment can be applied. For example, particularly preferred are the treatment of glass fiber with a silane-based or titanate-based coupling agent and the treatment of carbon fiber with aromatic polyether or aromatic polysulfone which is a heat-resistant polymer.

These fibrous reinforcements in the composite have a volume content of generally 5~85%, preferably 30~70%. When the volume content is lower than 5%, the effect of the reinforcement cannot be expected. On the other hand, a volume content higher than 85% is unfavorable because the interlaminar strength of the composite obtained is remarkably reduced.

No particular restriction is imposed upon the composite before heat treatment in the invention so long as the preparation process can provide the desired composite. Known processes can also be applied. The composite before heat treatment is prepared by mixing linear polyimide and/or linear polyamic acid of the invention with the fibrous reinforcement, or by coating or impregnating the fibrous reinforcement with a solid, suspension or solution of linear polyimide and/or linear polyamic acid.

Any known methods can be applied to impregnate the fibrous reinforcement with linear polyimide and/or linear polyamic acid. For example, the following methods are usually used in many cases.

1) A method for coating or for immersing and impregnating the fibrous reinforcement with linear polyimide and/or linear polyamic acid of the invention.

2) A method for fluidizing powder of linear polyimide and/or linear polyamic acid in the air or other gas and impregnating the fibrous reinforcement in the fluidized state.

No particular restriction is put upon the solvents used in the method 1). Solvents which can be used are those used for preparing linear polyimide and/or linear polyamic acid, and additionally acetone, methyl ethyl ketone and other ketone-based solvents; methanol, ethanol, isopropanol and other alcohol-based solvents; dioxane, tetrahydrofuran and other ether-based solvents; hexane, heptane, cyclohexane, benzene, toluene, xylene, anisole and other hydrocarbon-based-solvents; dichloromethane, chloroform, chlorobenzene, fluorobenzene and other halogenated hydrocarbon-based solvents which are obtained by partly or totally substituting hydrogen atoms on a hydrocarbon solvent with halogen atoms; ethyl acetate, butyl acetate, ethyl formate and other ester-based solvents; cresol, phenol and other phenol-base solvents; pyridine, picoline, triethylamine and other amine-based solvents; sulfolane, dimethyl sulfoxide and other sulfur-based solvents; and water.

These solvents can be used singly or as a mixture. No particular limitation is imposed upon the concentration, dissolving temperature, dissolving time and the size and shape of suspended particles in the solution or suspension of the method 1).

The preparation process of the composite consisting of the fibrous reinforcement and linear polyimide and/or linear polyamic acid includes, for example, the following common and practical method.

That is, a filament sheet or multidirectional, continuous filament was prepared by paralleling a unidirectional and long filament, for example, tow which was drawn out of a plurality of bobbins and was placed under a constant tension to the direction of take-off with a tension adjusting roll. On the other hand, liquid containing linear polyimide or linear polyamic acid is delivered from a die and applied on a roll surface. The thickness of coating is determined by the preset value of content percentage in the composite material obtained. Successively the above filament sheet or multidirectional continuous filament is impregnated by bringing into contact with the roll surface under a constant tension.

After impregnation by the above method, the solvent is removed by heat-drying. Linear polyamic acid simultaneously undergoes a dehydration ring-closure reaction in the heat-drying step.

The heat-drying temperature depends upon the kind of solvent and the concentration of solution or suspension, and is preferably 50°~300° C., more preferably 150°~250° C. A temperature exceeding 300° C. is unfavorable because a crosslinking reaction proceeds and the solvent removal is liable to be insufficient. On the other hand, satisfactory solvent removal cannot be achieved at less than 50° C. No restriction is put upon the atmosphere. The air, nitrogen, helium, neon and argon can be used. Preferred atmosphere is nitrogen and argon. The heat-drying time depends upon the drying temperature, kind of the solvent and concentration of the solution or suspension, and is preferably 0.5~48 hours, more preferably 1~6 hours. No particular limitation is put upon the heat-drying pressure. The reaction can be carried out under both atmospheric and reduced pressure. The type of drying equipment and drying method are not restricted in particular.

Further, the composite material of the invention which comprises thermoset polyimide and the fibrous reinforcement can be obtained by heat-treating the above obtained composite and polymerizing linear polyimide and/or linear polyamic acid through a crosslinking reaction on the basis of carbon-carbon triple bond.

Heat treatment temperature is usually in the range of 200°~500° C. preferably 250°~450° C., more preferably 350°~400° C. When the temperature is lower than 200° C., the heat-crosslinking reaction is difficult to progress. On the other hand, a temperature exceeding 500° C. leads to deterioration of the linear polyimide or linear polyamic acid and the properties of thermoset polyimide is unsatisfactory.

Heat treatment time differs depending upon the kind of linear polyimide or linear polyamic acid and aromatic dicarboxylic anhydride and heat treatment temperature, and is usually in the range of from 0.1 minute to 24 hours, preferably from 1 minute to 1 hours, more preferably 5~30 minutes. When the time is shorter than 0.1 minute, the heat-crosslinking reaction progresses insufficiently and thermoset polyimide cannot be obtained. On the other hand, a heat treatment time longer than 24 hours leads to deterioration of thermoset polyimide obtained and good properties of thermoset polyimide cannot be obtained. No particular limitation is imposed upon the heat treatment pressure. Heat treatment can be satisfactorily carried out at atmospheric pressure.

For example, the composite before heat treatment which comprises fibrous reinforcement and linear polyimide can be stacked and hot pressed to prepare laminated items of desired shape. In the preparation of laminated composite, the method and numbers of stacking can be changed depending upon the properties required. Heat treatment temperature, that is, heating temperature in the laminating step is usually higher than 300° C., preferably 350°–450° C. Laminating pressure changes depending upon the shape of laminated products and the pressure of 1 kg/cm² or more is satisfactory. Laminating time also changes depending upon the shape of laminated products and the time of 1 minute or more is sufficient. The heat-crosslinking reaction which converts linear polyimide and/or linear polyamic acid to thermoset polyimide at high temperature can be simultaneously carried out in the hot pressing step or separately carried out after the hot pressing step. The conditions of the heat-crosslinking reaction are the same as above.

Known processing methods such as compression molding, autoclave molding, stamping, mold forming, filament winding and tape winding can be employed for the composite of before or after heat treatment in the invention. No particular restriction is put upon the processing methods.

Further, shapes of the composite material are not restricted and include a plate, channel, angle, string, rod and pipe. No restriction is imposed upon the shape. Any kind of shape can be provided.

The present invention will hereinafter be illustrated further in detail by way of examples. In these examples, properties of polyimide and polyamic acid are measured by the following methods.

(1) Glass transition temperature

Measured with DSC(Shimadzu DT-40 series, DSC-41M), in a nitrogen stream, at a temperature rise rate of 16° C./min.

(2) 5% Weight loss temperature

Measured with DTG (Shimadzu DT-40 series, DTG-40M), in the air, at a temperature increase rate of 10° C./min.

(3) Inherent viscosity

Measured at 35° C., at a polyamic acid concentration of 0.5 g/100 ml in N,N-dimethylacetamide.

(4) Mechanical properties of a film

Tensile strength, elongation at break, and tensile elastic modulus are measured in accordance with ASTM-D 882.

EXAMPLE 1

To a reaction vessel equipped with a stirrer, reflux condenser and nitrogen inlet tube, 36.85 g (0.1 mol) of 4,4'-bis (3-aminophenoxy) biphenyl, 21.16 g (0.097 mol) of pyromellitic dianhydride, and 135.0 g of N-methyl-2-pyrrolidone were charged and stirred at 25° C. in a nitrogen atmosphere. After 6 hours, 1.49 g (0.006 mol) of 1-phenyl-2-(3,4-dicarboxyphenyl) acetylene anhydride was added and stirring was continued as intact for 18 hours. Linear polyamic acid precursor thus obtained had an inherent viscosity of 0.50 dl/g. The linear polyamic acid solution thus obtained was cast on a glass plate with a doctor blade and successively dried at 250° C. for 4 hours in a nitrogen stream to obtain a linear polyimide film to be heat-treated. The film had a thickness of 40 μm.

According to DSC measurement, the linear polyimide film to be heat-treated had a glass transition temperature at 250° C. and a heat-generation peak at 360° C. due to a heat-crosslinking reaction. Further, 20 mg of the linear polyimide film before heat treatment was put into 5 ml of p-chlorophenol and heated. The film was completely dissolved at 150° C. On the other hand, the linear polyimide film before heat treatment was heat treated at 360° C. for 30 minutes in a nitrogen stream to obtain a thermoset polyimide film having a thickness of 40 μm.

The thermoset polyimide film after heat treatment was measured with DSC. A glass transition temperature was observed at 276° C. However, no heat generation peak was detected. A p-chlorophenol dissolution test was carried out by similar procedures. The sample did not dissolve even after 1 hour in a heat-refluxing state, and no change was found at all by visual observation.

The thermoset polyimide film after heat treatment had a 5% weight loss temperature of 520° C., tensile strength of 12.5 kg/mm², tensile elastic modulus of 330 kg/mm² and elongation of 75%.

EXAMPLES 2–16

As illustrated in Table 1 and Table 2, various kinds of linear polyamic acid were obtained by using various kinds of aromatic diamine, aromatic tetracarboxylic dianhydride, aromatic dicarboxylic anhydride and solvent in a prescribed amount, respectively. The inherent viscosities of these polyamic acids are illustrated in Tables 1–2 together with the result of Example 1. Successively, these linear polyamic acids were imidized by the same procedures as carried out in Example 1 to obtain various kinds of linear polyimide film, respectively. The glass transition temperature, heat generation peak and p-chlorophenol dissolution of these films were measured by the same procedures as Example 1.

The results are illustrated in Tables 3–4. Successively, these linear polyimide films were subjected to heat treatment by the same procedures as carried out in Example 1 to obtain various kinds thermoset polyimide film after heat treatment. The film thickness, glass transition temperature, heat generation peak, p-chlorophenol dissolution, 5% weight loss temperature and mechanical properties were measured on the polyimide films obtained by carrying out the same procedures as Example 1. Results are illustrated in Tables 3–4 together with the results of Example 1.

COMPARATIVE EXAMPLES 1–2

As illustrated in Table 5, various kinds of linear polyamic acid were obtained by using various kinds of aromatic diamine, aromatic tetracarboxylic dianhydride, aromatic dicarboxylic anhydride and solvent in a prescribed amount, respectively. The inherent viscosities of these polyamic acids are illustrated in Table 5. Successively, these linear polyamic acids were imidized by the same procedures as carried out in Example 1 to obtain various kinds of linear polyimide film. The same measurements as Example 1 were carried out on each polyimide film thus obtained. Results are illustrated in Table 6.

EXAMPLES 17–19

As illustrated in Table 7, the solution of linear polyamic acid obtained in Examples 1, 3 and 6 are used in combination with unidirectional, long filaments to obtain a composite material.

That is, 100 threads of carbon fiber tow (BESFIGHT HTA-7-3000) which were drawn from 100 bobbins were paralleled to prepare a filament sheet having a width of 150 mm. The above solutions of linear polyamic acid were delivered from a die by using a contact-feeding pump and applied on a roll having a diameter of 240 mm so as to obtain a thickness of 240 μm. The above obtained filament sheet was brought into contact with the roll surface under a tension of 150 kg to impregnate the filament sheet with linear polyamic acid. Successively, the filament sheet which was impregnated with the solution was dried in a drying oven under an air stream at 150° C. for 30 minutes while transferring at a speed of 10 cm/min.

Further, the filament sheet was passed through a drying oven at 280° C. for 30 minutes in a nitrogen stream at the same speed. Successively the filament was gradually cooled and wound up with a reeling machine. The composite material obtained had a width of 150 mm and thickness of 0.15 mm. Thereafter, 20 sheets of the composite material thus obtained were stacked up to the same direction, hot pressed at 370° C. for 20 minutes under the pressure of 20 kg/cm$^2$ and cooled to 100° C. while maintaining the pressure to obtain a flat plate having dimensions of 200×200 mm. Internal void volume was calculated from the specific gravity of the plate and weight percentage of filament content. Specimens were cut out of the plate and flexural strength and flexural modules were measured in accordance with ASTM-790.

Results are illustrated in Table 7.

EXAMPLES 20–22

To each solution of linear polyamic acid obtained in Examples 1, 2 and 7, acetic anhydride and pyridine were added and stirred as intact at room temperature for 5 hours to carry out chemical imidization. Each polyimide was obtained in the form of powder. Three kinds of linear polyimide powder were individually dispersed in a single solvent.

The single solvent was methyl ethyl ketone, methanol and hexane. The suspension prepared had a concentration of 25% by weight. These 3 kinds of suspension of each linear polyimide were processed by the same procedures as carried out in Examples 17–19 to obtain composite materials. However, the roll was not used for impregnating the suspension. The impregnation was carried out on a steel belt having a width of 240 mm and flat portion of 300 mm. Thereafter, drying press lamination and heat treatment were carried out by the same procedures as shown in Examples 17–19. The composite materials thus obtained were evaluated by the same method as Examples 17–19. Results are shown in Table 7.

EXAMPLES 23 and 24

The solution of linear polyamic acid obtained in Example 1 and the solution of linear polyamic acid obtained in Example 3 were chemically imidized by the same procedures as carried out in Examples 20–22. The linear polyimide powder thus obtained was converted to suspensions by using methyl ethyl ketone. By using the suspensions thus obtained and a plain weave fabric of carbon fiber as fibrous reinforcement, composite materials were respectively prepared by the following process.

Multidirectional, continuous filaments which were mounted on a delivery axis were placed under tension of 30 kg to the take-up direction with a tension adjusting roll and passed while making contact with a roll having a diameter of 240 mm. On the other hand, said solution and said suspension were delivered from a die with a constant feeding pump and coated on a steel belt having a width of 240 mm and flat portion of 300 mm. The above filaments were brought into contact with the coated belt to carry out impregnation. Thereafter, drying, press lamination and heat treatment were carried out by the same procedures as Examples 17–19. The composite materials obtained were evaluated by the same methods as carried out in Examples 17–19. Results are illustrated in Table 7.

EXAMPLES 25 and 26

The linear polyamic acid solution obtained in Example 3 and the linear polyimide suspension obtained in Example 6 were used. A plain weave fabric of glass fiber was used as fibrous reinforcement in place of the plain weave fabric of carbon fiber in Examples 23 and 14.

Composite materials were obtained by carrying out the same process as shown in Examples 23 and 24. Evaluation results of the composite materials obtained are illustrated in Table 7.

TABLE 1

| Example | Diamine (1) (mol/g) (2) (mol/g) | Tetracarboxylic dianhydride (1) (mol/g) (2) (mol/g) | Dicarboxylic anhydride (mol/g) | solvent | Inherent viscosity (dl/g) |
|---|---|---|---|---|---|
| 1 | BAPB (0.100/36.85) none (—/—) | PMDA (0.097/21.16) none (—/—) | PCA (0.006/1.49) | NMP | 0.50 |
| 2 | BAPB (0.090/33.17) ODA (0.010/2.00) | PMDA (0.097/21.16) none (—/—) | PCA (0.006/1.49) | NMP | 0.51 |
| 3 | BAPB (0.070/25.80) ODA (0.030/6.01) | PMDA (0.097/21.16) none (—/—) | PCA (0.006/1.49) | NMP | 0.50 |
| 4 | BAPB (0.100/36.85) none (—/—) | PMDA (0.087/19.04) BPDA (0.0097/2.85) | PCA (0.006/1.49) | NMP | 0.52 |
| 5 | BAPB (0.100/36.85) none (—/—) | PMDA (0.068/14.81) BPDA (0.0291/8.56) | PCA (0.006/1.49) | NMP | 0.48 |
| 6 | BAPB (0.100/36.85) none (—/—) | PMDA (0.0485/10.58) BPDA (0.0485/14.27) | PCA (0.006/1.49) | NMP | 0.49 |
| 7 | BAPB (0.100/36.85) none (—/—) | PMDA (0.0291/6.34) BPDA (0.068/20.01) | PCA (0.006/1.49) | NMP | 0.50 |
| 8 | BAPB (0.100/36.85) none (—/—) | PMDA (0.0097/2.11) BPDA (0.087/25.58) | PCA (0.006/1.49) | NMP | 0.51 |
| 9 | BAPB (0.100/36.85) none (—/—) | PMDA (0.095/20.71) none (—/—) | PCA (0.010/2.48) | NMP | 0.40 |
| 10 | BAPB (0.070/25.80) ODA (0.030/6.01) | PMDA (0.090/19.63) none (—/—) | PCA (0.020/4.96) | NMP | 0.35 |
| 11 | BAPB (0.100/25.80) none (—/—) | PMDA (0.040/8.72) BPDA (0.040/11.75) | PCA (0.040/9.92) | NMP | 0.29 |

TABLE 2

| Example | Diamine (1) (mol/g) (2) (mol/g) | Tetracarboxylic dianhydride (1) (mol/g) (2) (mol/g) | Dicarboxylic anhydride (mol/g) | solvent | Inherent viscosity (dl/g) |
|---|---|---|---|---|---|
| 12 | BAPB (0.100/36.85) none (—/—) | PMDA (0.097/21.16) none (—/—) | PCA (0.006/1.49) | DMAc | 0.50 |
| 13 | BAPB (0.090/33.17) ODA (0.010/2.00) | PMDA (0.097/21.16) none (—/—) | PCPA (0.006/2.05) | NMP | 0.51 |
| 14 | BAPB (0.100/36.85) none (—/—) | PMDA (0.0485/10.58) BPDA (0.0485/14.27) | MPCA (0.006/1.57) | NMP | 0.49 |
| 15 | BAPB (0.100/36.85) none (—/—) | PMDA (0.0097/2.11) BPDA (0.087/25.58) | PCNA (0.006/1.79) | DMF | 0.48 |
| 16 | BAPB (0.100/36.85) none (—/—) | PMDA (0.0097/2.11) BPDA (0.087/25.58) | PCA (0.006/1.49) | m-cresol | 0.51 |

Abbreviations in Table 1 and Table 2
BAPB: 4,4'-bis(3-aminophenoxy)biphenyl
QDA: 4,4'-oxydianiline
PMDA: pyromellitic dianhydride
BPDA: 3,3',4,4'-biphenyltetracarboxylic dianhydride
PCA: 1-phenyl-2-(3,4-dicarboxyphenyl)acetylene anhydride
PCPA: 1-phenyl-2-[4-(3,4-dicarboxyphenoxy)phenyl]acetylene anhydride
MPCA: 1-(4-methylphenyl)-2-(3,4-dicarboxyphenyl)acetylene anhydride
PCNA: 1-phenyl-2-[2-(6,7-dicarboxy)naphthyl]acetylene anhydride
NMP: N-methyl-2-pyrrolidone
DMAC: N,N-dimethylacetamide
DMF: N,N-dimethylformamide

TABLE 3

| Example | Film thickness after heat treatment (μm) | p-chlorophenol dissolution Heat treatment before | p-chlorophenol dissolution Heat treatment after | Tg (°C.) Heat treatment before | Tg (°C.) Heat treatment after | Heat generation peak (°C.) Heat treatment before | Heat generation peak (°C.) Heat treatment after | Td5 (°C.) | TS (kg/mm²) | EL (%) | TM (kg/mm²) |
|---|---|---|---|---|---|---|---|---|---|---|---|
| 1 | 40 | soluble | insoluble | 247 | 275 | 340 | not found | 525 | 12.5 | 75 | 330 |
| 2 | 40 | ↑ | ↑ | 250 | 280 | 342 | ↑ | 521 | 12.9 | 70 | 340 |
| 3 | 40 | ↑ | ↑ | 280 | 303 | 350 | ↑ | 523 | 13.7 | 55 | 360 |
| 4 | 39 | ↑ | ↑ | 239 | 266 | 337 | ↑ | 524 | 12.4 | 70 | 325 |
| 5 | 40 | ↑ | ↑ | 235 | 261 | 338 | ↑ | 519 | 12.0 | 65 | 320 |
| 6 | 42 | ↑ | ↑ | 232 | 259 | 336 | ↑ | 510 | 11.5 | 60 | 310 |
| 7 | 41 | ↑ | ↑ | 229 | 262 | 330 | ↑ | 518 | 11.0 | 58 | 309 |
| 8 | 40 | ↑ | ↑ | 224 | 255 | 332 | ↑ | 522 | 11.0 | 57 | 307 |
| 9 | 40 | ↑ | ↑ | 243 | 272 | 330 | ↑ | 519 | 12.3 | 68 | 350 |
| 10 | 39 | ↑ | ↑ | 275 | 301 | 328 | ↑ | 520 | 11.9 | 60 | 362 |
| 11 | 40 | ↑ | ↑ | 220 | 252 | 320 | ↑ | 523 | 11.0 | 55 | 320 |

TABLE 4

| Example | Film thickness after heat treatment (μm) | p-chlorophenol dissolution Heat treatment before | p-chlorophenol dissolution Heat treatment after | Tg (°C.) Heat treatment before | Tg (°C.) Heat treatment after | Heat generation peak (°C.) Heat treatment before | Heat generation peak (°C.) Heat treatment after | Td5 (°C.) | TS (kg/mm²) | EL (%) | TM (kg/mm²) |
|---|---|---|---|---|---|---|---|---|---|---|---|
| 12 | 39 | soluble | insoluble | 246 | 270 | 340 | not found | 521 | 12.6 | 74 | 332 |
| 13 | 40 | ↑ | ↑ | 249 | 277 | 342 | ↑ | 514 | 12.7 | 73 | 342 |
| 14 | 40 | ↑ | ↑ | 230 | 258 | 336 | ↑ | 516 | 11.4 | 64 | 312 |
| 15 | 42 | ↑ | ↑ | 225 | 256 | 339 | ↑ | 523 | 12.3 | 68 | 319 |
| 16 | 38 | ↑ | ↑ | 225 | 253 | 341 | ↑ | 518 | 12.4 | 73 | 324 |

Abbreviations in Table 3 and Table 4
Tg: Glass transition temperature
Td5: 5% Weight loss temperature
TS: Tensile strength (kg/mm²)
EL: Elongation (%)
TM: Tensile modulus (kg/mm²)

TABLE 5

| Comparative example | Diamine (1) (mol/g) (2) (mol/g) | Tetracarboxylic dianhydride (1) (mol/g) (2) (mol/g) | Dicarboxylic anhydride (mol/g) | solvent | Inherent viscosity (dl/) |
|---|---|---|---|---|---|
| 1 | BAPB (0.100/36.85) none (—/—) | PMDA (0.097/21.16) none (—/—) | PA (0.006/1.49) | NMP | 0.50 |
| 2 | BAPB (0.090/33.17) ODA (0.010/2.00) | PMDA (0.009/1.96) none (—/—) | PCA (0.182/248) | NMP | 0.09 |

Abbreviations in Table 5
BAPB: 4,4'-bis ( 3-aminophenoxy)biphenyl
QDA: 4,4'-oxydianiline
PMDA: pyromellitic dianhydride
PCA: 1-phenyl-2-(3,4-dicarboxyphenyl)acetylene anhydride
PA: phthalic anhydride
NMP: N-methyl-2-pyrrolidone

TABLE 6

| Comparative example | Film thickness after heat treatment (μm) | p-chlorophenol dissolution Heat treatment before | p-chlorophenol dissolution Heat treatment after | Tg (°C.) Heat treatment before | Tg (°C.) Heat treatment after | Heat generation peak (°C.) Heat treatment before | Heat generation peak (°C.) Heat treatment after | Td5 (°C.) | TS (kg/mm²) | EL (%) | TM (kg/mm²) |
|---|---|---|---|---|---|---|---|---|---|---|---|
| 1 | 39 | soluble | soluble | 246 | 247 | not found | — | 521 | 11.5 | 85 | 300 |
| 2 | film forming impossible | test impossible | — | — | — | — | — | — | — | — | — |

Abbreviations in Table 6
Tg: Glass transition temperature
Td5: 5% Weight loss temperature
TS: Tensile strength (kg/mm²)
EL: Elongation (%)
TM: Tensile modulus (kg/mm²)

TABLE 7

| Example | Example of polymer | Oligomer | Impregnation | Fibrous reinforcement Fiber | Fibrous reinforcement Shape | Fibrous reinforcement Volume content (%) | Fibrous reinforcement Void (%) | Film properties Flexural strength (kg/mm²) | Film properties Flexural modulus (kg/mm²) |
|---|---|---|---|---|---|---|---|---|---|
| 17 | 1 | amic acid | amic acid solution | carbon | tow | 60 | 0.1 | 220 | 13500 |
| 18 | 3 | ↑ | ↑ | ↑ | ↑ | 59 | 0.2 | 244 | 16000 |
| 19 | 6 | ↑ | ↑ | ↑ | ↑ | 60 | 0.1 | 203 | 11600 |
| 20 | 1 | imide | imide suspension | ↑ | ↑ | 59 | 0.0 | 223 | 13600 |
| 21 | 2 | ↑ | ↑ | ↑ | ↑ | 61 | 0.1 | 227 | 14200 |
| 22 | 7 | ↑ | ↑ | ↑ | ↑ | 60 | 0.1 | 195 | 10300 |
| 23 | 1 | amic acid | amic acid solution | ↑ | fabric | 62 | 0.2 | 227 | 13400 |
| 24 | 9 | imide | imide suspension | ↑ | ↑ | 60 | 0.2 | 253 | 16200 |
| 25 | 3 | amic acid | amic acid solution | glass | ↑ | 58 | 0.3 | 212 | 8900 |
| 26 | 6 | imide | imide suspension | ↑ | ↑ | 61 | 0.3 | 186 | 7800 |

What is claimed is:

1. Linear polyimide represented by the formula (1):

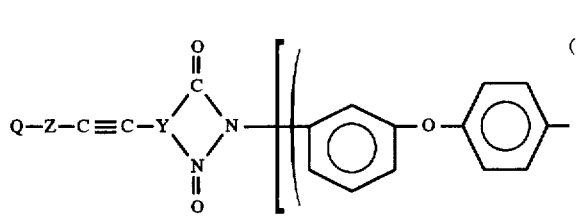

(1)

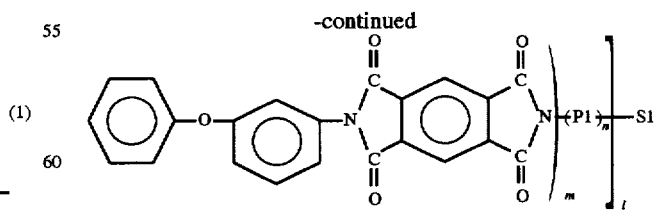

wherein P1 is recurring units of the formula (a) or the formula (b):

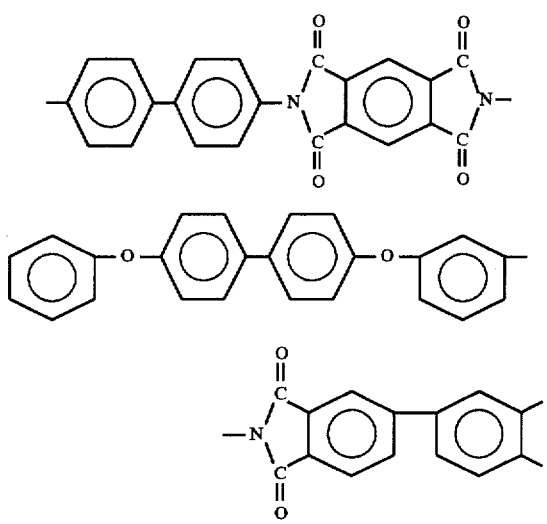

and S1 is one or more monovalent radicals represented by the formula (c) or the formula (d):

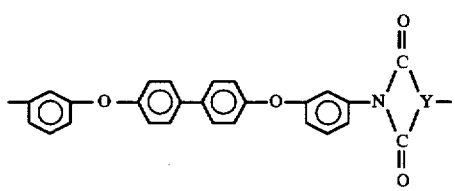

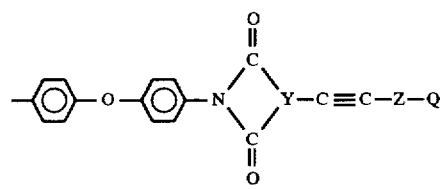

wherein Y and Z are radicals having 6–18 carbon atoms and are respectively selected from a monoaromatic radical, condensed polyaromatic radical or non-condensed aromatic radical connected each to other with a bridge member selected from a direct bond, carbonyl radical, sulfonyl radical, sulfoxide radical, ether radical, isopropylidene radical, hexafluorinated isopropylidene radical or sulfide radical, Y is a trivalent radical, Z is a divalent radical, Q is a monovalent substituent located on an aromatic ring of Z and is selected from a hydrogen atom, halogen atom, alkyl or alkoxy radical having 1–3 carbon atoms, cyano radical, or halogenated alkyl or halogenated alkoxy radical having 1–3 carbon atoms wherein hydrogen atoms of the alkyl or alkoxy radical are partly or totally substituted with halogen atoms, m and n are respectively mol % of recurring units, m is 100–1 mol %, n is 0–99 mol %, fixed order or regularity is absent along the recurring units, and l is a polymerization degree and is an integer of 1–100.

2. Linear polyimide according to claim 1 wherein linear polyamic acid, the precursor of the linear polyimide of claim 1, represented by the formula (2):

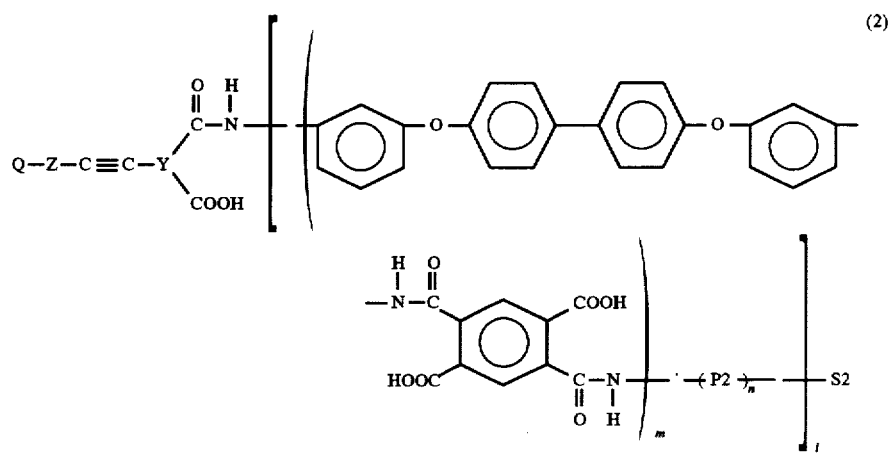

wherein P2 is recurring units of the formula (e) or the formula (f):

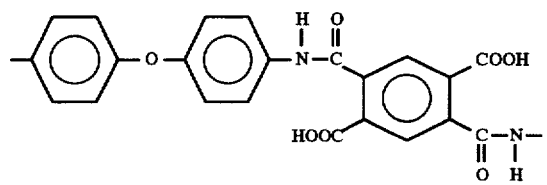

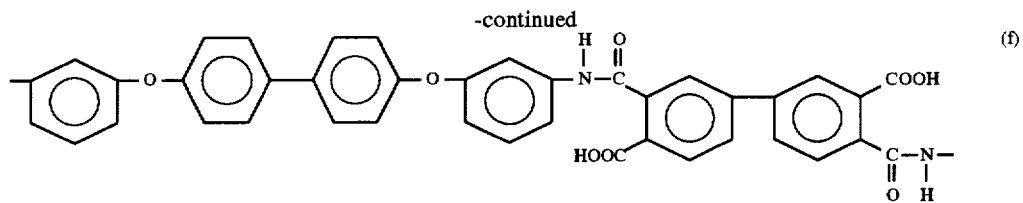

and S2 is one or more monovalent radicals represented by the formula (g) or the formula (h):

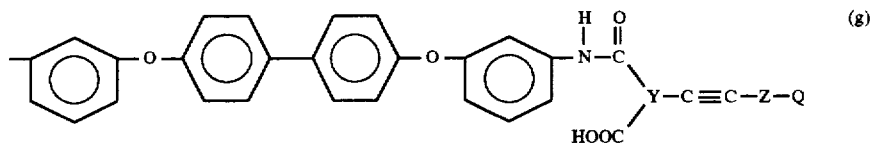

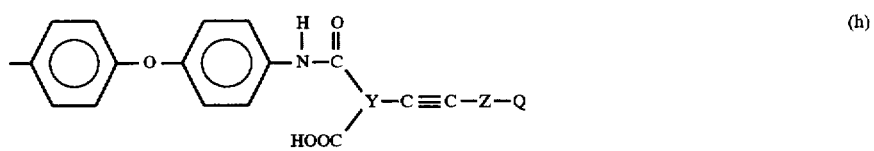

wherein Y, Z, Q, m, n and l are the same as in the formula (1), has an inherent viscosity of 0.05–1.0 dl/g at 35° C. at a concentration of 0.5 g/dl in N,N-dimethylacetamide solvent.

3. Linear polyimide represented by the formula (3):

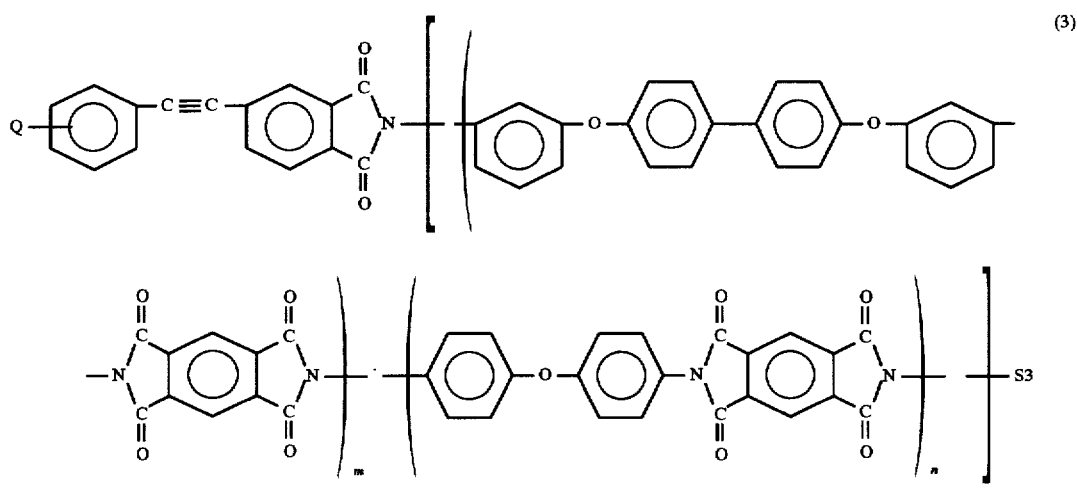

wherein S3 is one or more monovalent radicals represented by the formula (i) or the formula (j):

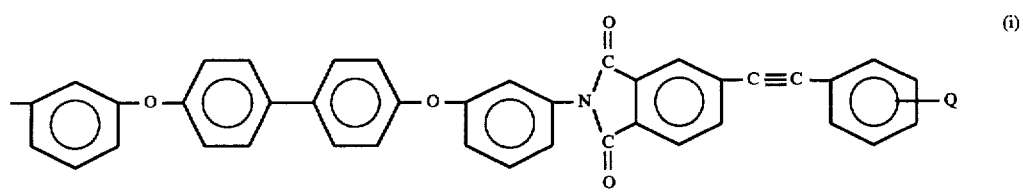

-continued

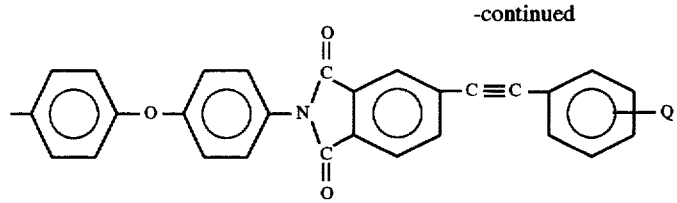
(j)

wherein Q is a monovalent radical selected from a hydrogen atom, halogen atom, alkyl or alkoxy radical having 1–3 carbon atoms, cyano radical, or halogenated alkyl or halogenated alkoxy radical having 1–3 carbon atoms wherein hydrogen atoms of the alkyl or alkoxy radical are partly or totally or totally substituted with halogen atoms, m and n are respectively mol % of recurring units, m is 100–70 mol %, n is 0–30 mol %, fixed order or regularity is absent among the recurring units, and l is a polymerization degree and is an integer of 1–100.

4. Linear polyimide represented by the formula (5):

wherein Q is a monovalent radical selected from a hydrogen atom, halogen atom, alkyl or alkoxy radical having 1–3 carbon atoms, cyano radical, or halogenated alkyl or halogenated alkoxy radical having 1–3 carbon atoms wherein hydrogen atoms of the alkyl or alkoxy radical are partly or totally substituted with halogen atoms, m and n are respectively mol % of recurring units, m is 100–70 mol %, n is 0–30 mol %, fixed order or regularity is absent among the recurring units, and l is a polymerization degree and is an integer of 1–100.

5. Linear polyimide represented by the formula (7):

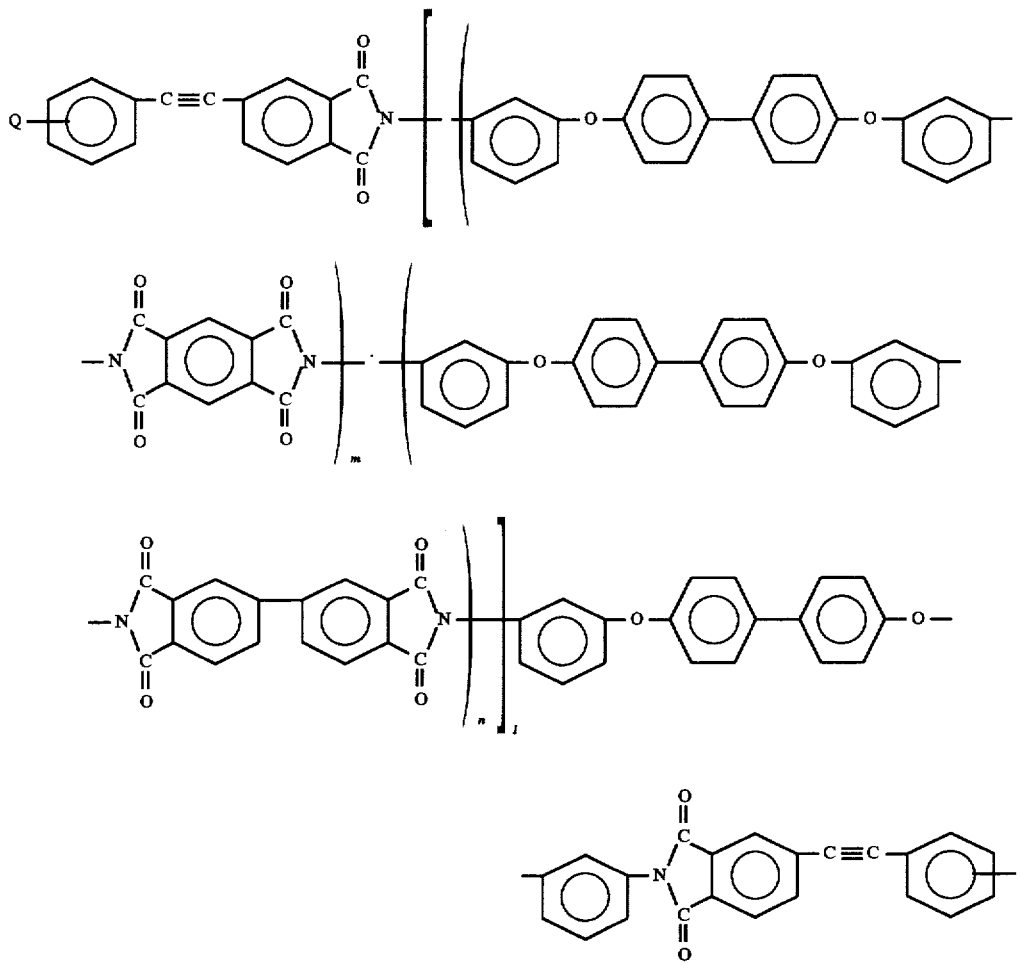

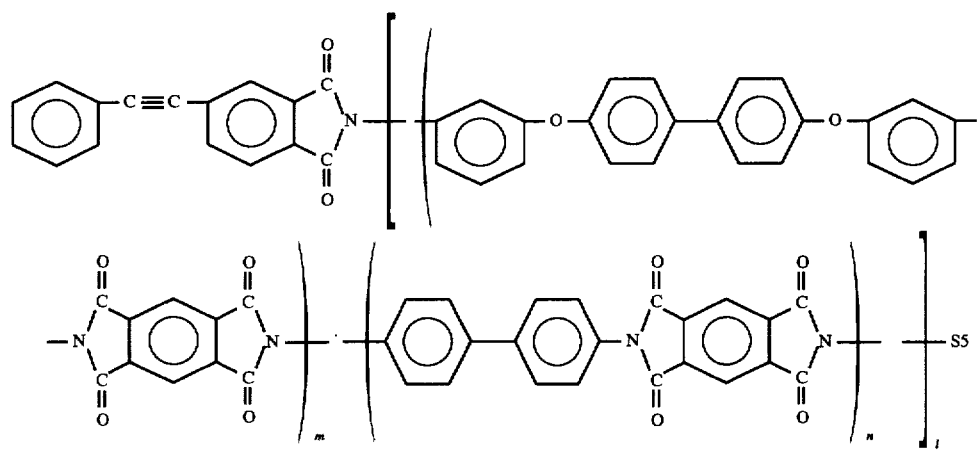
(7)
wherein S5 is one or more monovalent radicals of the formula (o) or the formula (p):
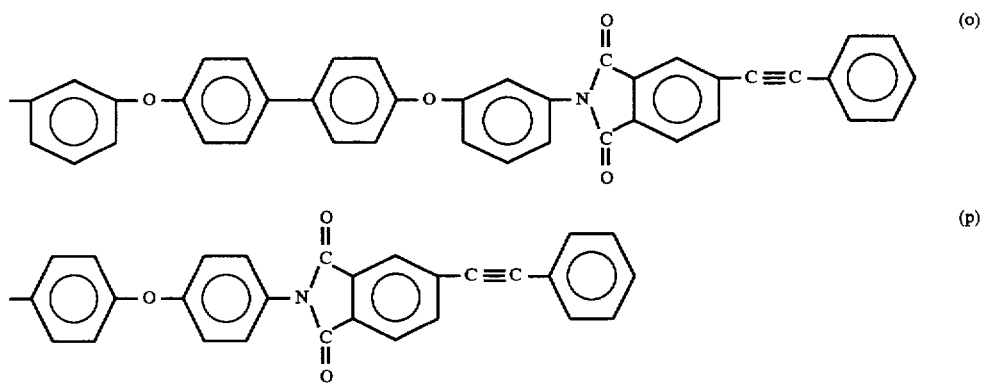
(o)
(p)
m and n are respectively mol % of recurring units, m is 100~70 mol %, n is 0~30 mol %, fixed order or regularity is absent among the recurring units, and l is a polymerization degree and is an integer of 1~100.
6. Linear polyimide represented by the formula (9):
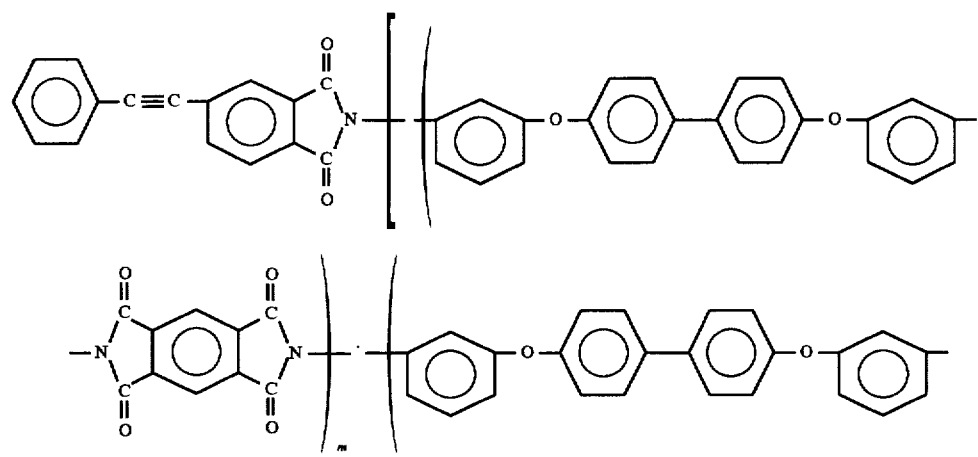
(9)

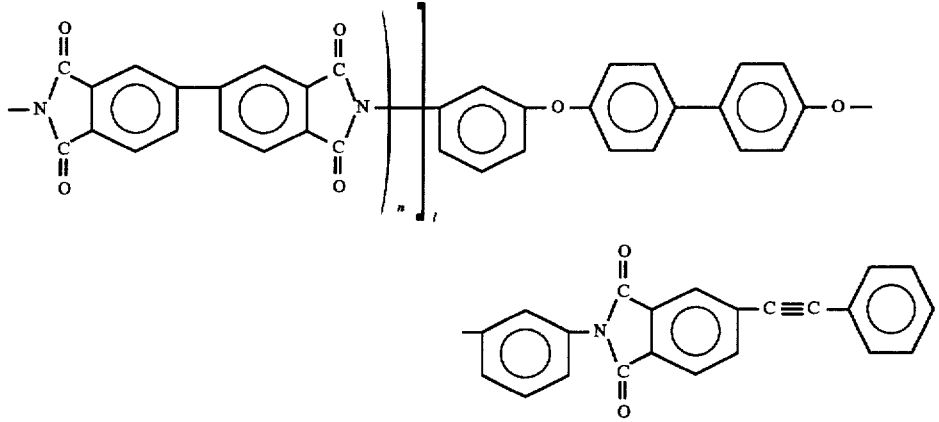

wherein m and n are respectively mol % of recurring units, m is 100~70 mol %, n is 0~30 mol %, fixed order or regularity is absent among the recurring units, and l is a polymerization degree and is an integer of 1~100.

7. Linear polyamic acid which is the precursor of linear polyimide according to claim 1 and has an inherent viscosity of 0.05~1.0 dl/g at 35° C. at a concentration of 0.5 g/dl in a N,N-dimethylacetamide solvent.

8. Thermoset polyimide obtained by heat-treating linear polyimide according to claim 1.

9. Thermoset polyimide obtained by heat-treating linear polyamic acid according to claim 1.

10. A composite material comprising linear polyimide according to claim 1 and a fibrous reinforcement.

11. A composite material comprising linear polyamic acid according to claim 1 and a fibrous reinforcement.

12. A composite material being obtained by heat-treating the composite material according to claim 1 and comprising thermoset polyimide and a fibrous reinforcement.

13. A solution or a suspension comprising linear polyimide according to claim 1.

14. A solution or a suspension comprising linear polyamic acid according to claim 1.

* * * * *